(12) United States Patent
Scullion et al.

(10) Patent No.: US 6,974,598 B2
(45) Date of Patent: Dec. 13, 2005

(54) METHOD OF COOLING A BEVERAGE

(75) Inventors: Simon Daniel Scullion, Staffordshire (GB); Peter Thomas Foster, Staffordshire (GB); Stephen Paul Smith, Derbyshire (GB)

(73) Assignee: Coors Worldwide Inc., Golden, CO (US)

( * ) Notice: Subject to any disclaimer, the term of this patent is extended or adjusted under 35 U.S.C. 154(b) by 0 days.

(21) Appl. No.: 10/310,458

(22) Filed: Dec. 5, 2002

(65) Prior Publication Data

US 2003/0161925 A1 Aug. 28, 2003

Related U.S. Application Data

(63) Continuation-in-part of application No. 09/700,512, filed as application No. PCT/GB99/01551 on May 14, 1999.

(51) Int. Cl.[7] .................................................. C12G 3/00
(52) U.S. Cl. ........................................................ 426/592
(58) Field of Search ......................................... 426/592

(56) References Cited

U.S. PATENT DOCUMENTS

| | | | |
|---|---|---|---|
| 3,826,829 A | 7/1974 | Maralieh |
| 4,094,445 A | 6/1978 | Bevan |
| 5,464,124 A | 11/1995 | Weyh et al. |
| 5,709,095 A | 1/1998 | Johnson |
| 2003/0070446 A1 | 4/2003 | Scullion et al. |
| 2003/0161931 A1 | 8/2003 | Scullion et al. |
| 2003/0161932 A1 | 8/2003 | Anderson et al. |
| 2003/0211219 A1 | 11/2003 | Scullion et al. |

FOREIGN PATENT DOCUMENTS

| | | |
|---|---|---|
| EP | 0033560 | 1/1981 |
| EP | 0127686 | 12/1983 |
| EP | 0204899 | 3/1986 |
| EP | 0268097 | 5/1988 |
| EP | 0336462 | 3/1989 |
| EP | 0584127 | 5/1992 |
| EP | 0683223 | 11/1995 |
| EP | 0683224 | 11/1995 |
| EP | 0919519 | 7/1998 |
| GB | 1208334 | 2/1968 |
| GB | 2089322 | 12/1980 |
| GB | 2172266 | 3/1985 |
| GB | 2172876 | 8/1985 |
| GB | 2167313 | 11/1985 |
| GB | 2167388 | 11/1985 |
| GB | 2180632 | 9/1986 |
| GB | 2208918 | 8/1988 |
| GB | 2213246 | 12/1988 |
| GB | 2232400 | 5/1989 |
| GB | 2228310 | 2/1990 |
| GB | 2241034 | 2/1990 |
| GB | 2253164 | 11/1990 |
| GB | 2251863 | 12/1991 |
| GB | 2260310 | 7/1992 |
| GB | 2298181 | 10/1994 |
| GB | 2289425 | 5/1995 |
| GB | 2289477 | 5/1995 |
| GB | 2318112 | 5/1995 |
| GB | 2294884 | 10/1995 |
| GB | 2297093 | 10/1995 |
| GB | 2300146 | 10/1995 |
| GB | 2308093 | 10/1995 |
| GB | 2308570 | 10/1995 |
| GB | 2294750 | 11/1995 |
| GB | 2323153 | 11/1995 |
| GB | 2314148 | 6/1996 |
| GB | 2302403 | 1/1997 |
| GB | 2309295 | 1/1997 |
| GB | 2320318 | 2/1997 |
| GB | 2312201 | 4/1997 |
| GB | 2327748 | 7/1997 |
| GB | 2326633 | 6/1998 |
| WO | WO 86/00064 | 6/1985 |
| WO | WO 88/07972 | 4/1988 |
| WO | WO 89/08074 | 3/1989 |
| WO | WO 91/01635 | 8/1990 |
| WO | WO 91/07085 | 11/1990 |
| WO | WO 91/08978 | 11/1990 |
| WO | WO 94/12427 | 11/1992 |
| WO | WO 94/24039 | 4/1994 |
| WO | WO 95/18764 | 1/1995 |
| WO | WO 97/16962 | 11/1995 |
| WO | WO 96/27298 | 3/1996 |
| WO | WO 97/18879 | 11/1996 |
| WO | WO 98/37011 | 2/1998 |
| WO | WO 98/42612 | 3/1998 |
| WO | WO 98/42613 | 3/1998 |
| WO | WO 99/37578 | 1/1999 |

OTHER PUBLICATIONS

Cassidy, M., San Jose Mercury News, Morning Ed., Final, Science and Medicine, p. 1C, Jul. 31, 1990.*

Phanny, www.mit.edu/~mbarker/sum97/awar970630.txt, Jun. 30, 1997.*

Super–Cooler, or, A Beverage–Cooling Distinctive Experience, www. armory.com/~spcecdt/text/supercool.html, 1996.*

WPI Abstract Accession No. 93–312761 & DE 4305660.

EPODOC Abstract & CN 1140758.

Database WPIXP002119502 & JP 46 010033 B (Morinaga Milk Inds Co Ltd.).

* cited by examiner

*Primary Examiner*—Keith Hendricks
(74) *Attorney, Agent, or Firm*—Baker Botts L.L.P.

(57) ABSTRACT

A method of keeping an alcoholic beverage in an open topped vessel cool, said beverage comprising a water content and a dissolved gas content, and said method comprising forming ice in the beverage in the open-topped vessel said ice having a cooling effect on the beverage, said ice being formed in the beverage from water of said water content.

33 Claims, 11 Drawing Sheets

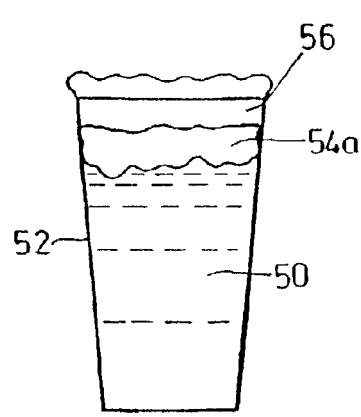
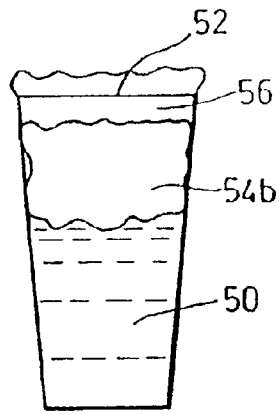
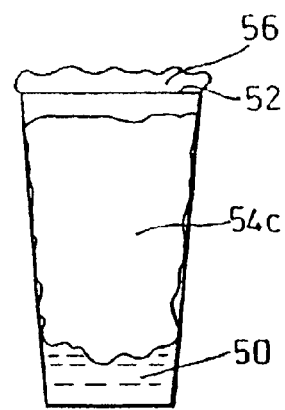
*Fig. 2*       *Fig. 3*       *Fig. 4*
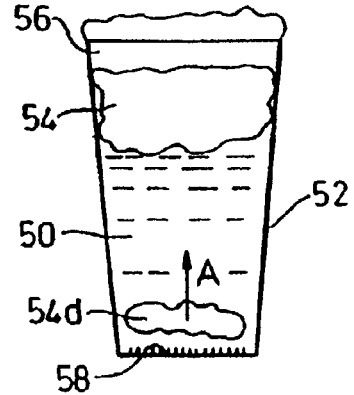
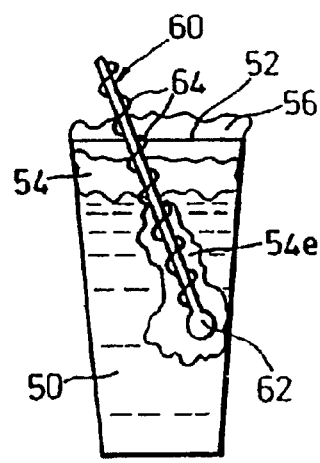
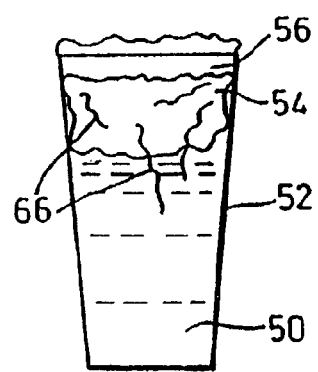
*Fig. 5*       *Fig. 6*       *Fig. 7*

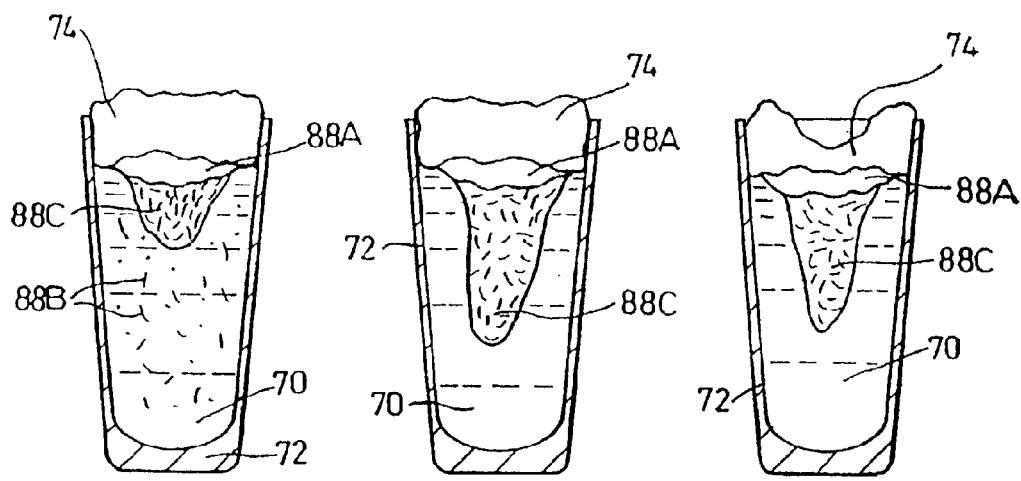
*Fig. 13*   *Fig. 14*   *Fig. 15*
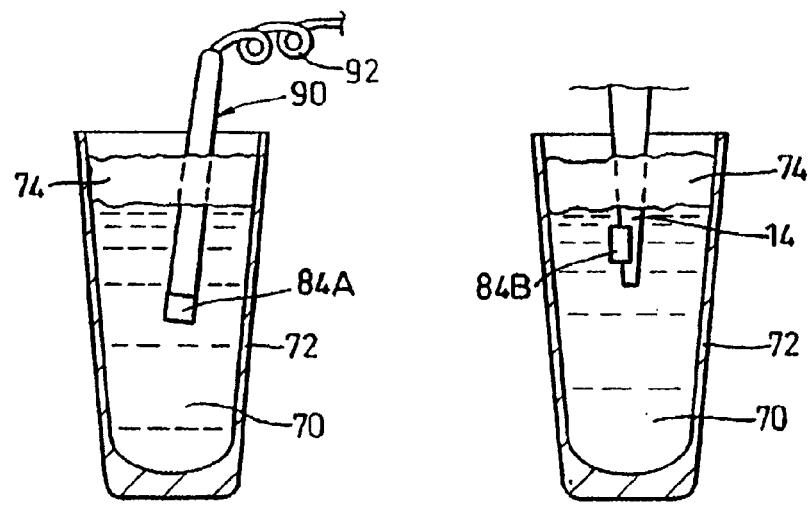
*Fig. 16*   *Fig. 17*

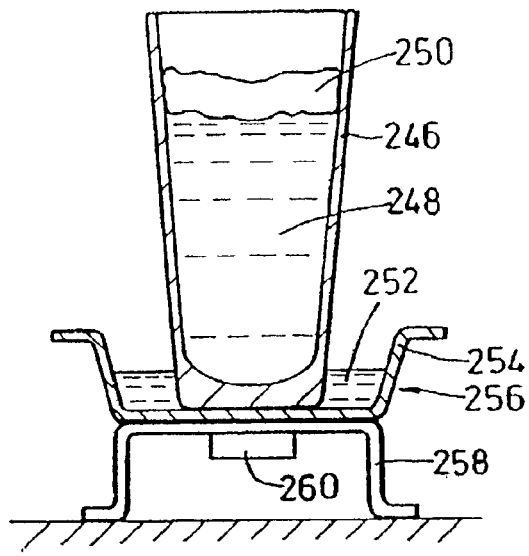
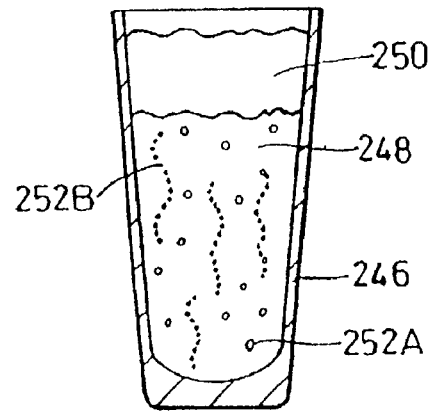
Fig. 21
Fig. 22
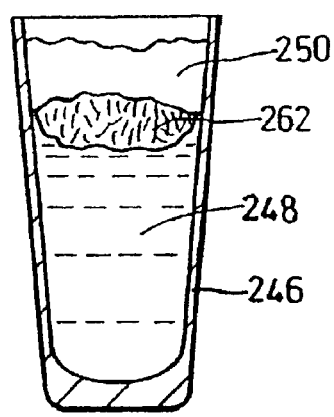
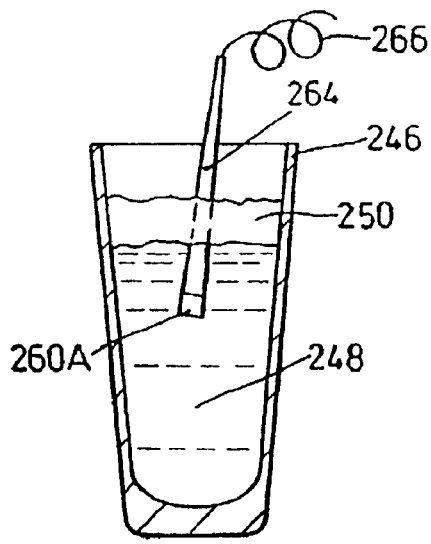
Fig. 23
Fig. 24
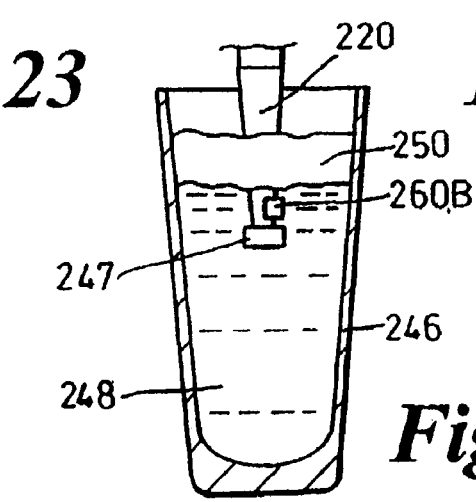
Fig. 25

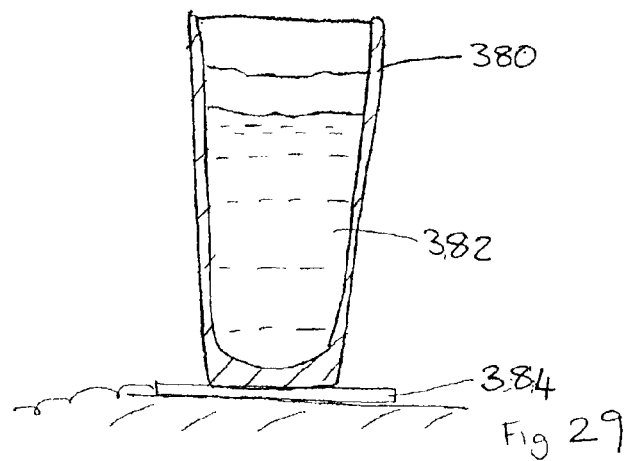
Fig 29
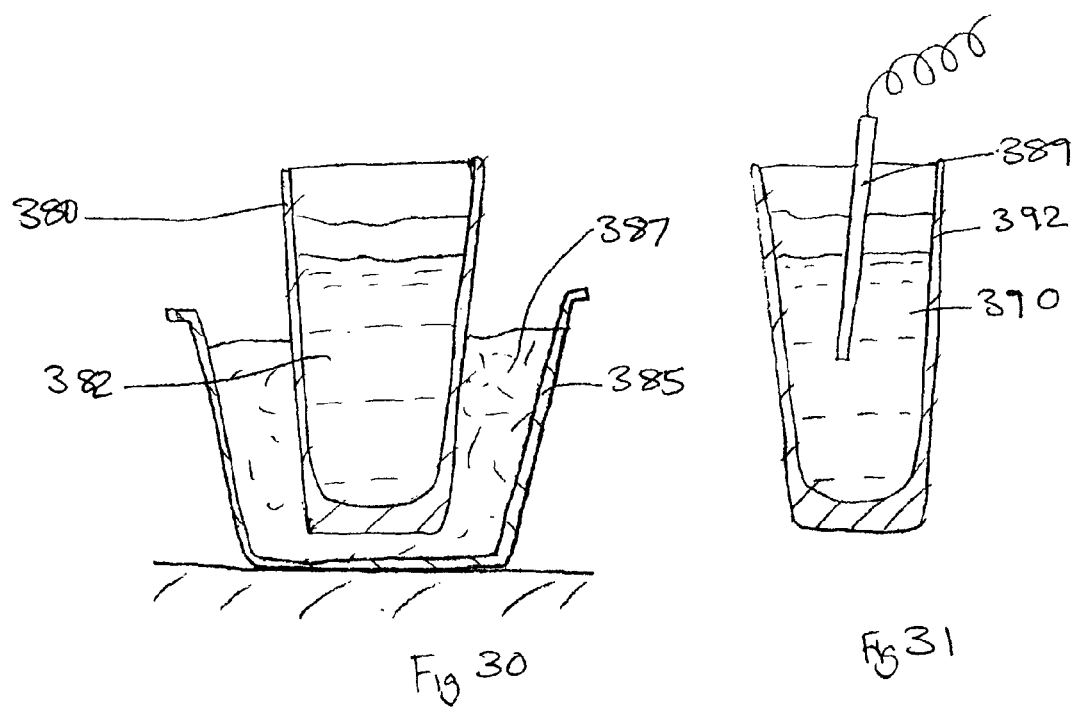
Fig 30
Fig 31

METHOD OF COOLING A BEVERAGE

This application is a Continuation-in-part of (CIP) of 09/700,512, filed Jan. 12, 2001, which is a 371 of International Application No. PCT/GB99/01551, filed May 14, 1999.

This invention relates to a beverage, to methods of presenting or serving a beverage, to providing a visual display in a beverage, and to apparatus to supply draught beverage.

The beverage concerned comprises a water content and a dissolved gas content.

The beverage may be an alcoholic beverage or a non-alcoholic beverage. For example, the beverage may be a beer, a cider, a flavoured alcoholic beverage, for example an alcoholic lemonade or other alco-pop style of drink, or a so-called low alcoholic drink. The term "beer" embraces lager, ale, porter and stout and includes a beverage comprising hops flavouring, an alcohol content derived from malt and fermentation, a water content, and a dissolved gas content.

One object is to provide a cool beverage using ice therein in a way which a consumer may find more agreeable because dilution of the drink cannot occur.

Another object is to provide a beverage in which the existence of cooling ice therein may be sustained whereby the drink may be kept cold for an extended period of time.

Another object is to provide a beverage in which a head thereon may be sustained.

Another object is to provide a beverage in which ice may develop therein as an interesting visual display.

According to a first aspect of the invention there is provided a beverage in an open-topped vessel, said beverage comprising a water content and a dissolved gas content, and in said vessel the beverage having a head of foam over ice, said ice being formed in the beverage from water of said water content.

The vessel may be any suitable vessel, for example a drinking vessel, for example a glass.

Preferably there is a layer of ice adjacent the head, in contact with the head. Preferably there is a projection of ice extending downwards, away from the head, and being provided in the region of the head. The projection of the ice may depend directly from the head, or from a layer of ice beneath the head.

The ice is preferably made of many small crystals of ice, rather than a single solid mass. The ice is preferably slushy in character, rather than being a solid mass. There may be more than one kind of ice formation in the beverage. There may be a fine, powdery ice. There may be a flaky ice, of the order of 1 mm or 2 mm or 3 mm or 4 mm, or more, in their largest dimension of the flakes. Preferably the ice crystals are no larger in their largest dimension than 10 mm. Preferably, three quarters of the ice flakes or crystals are of the order of 1 mm, 2 mm, 3 mm or 4 mm or no larger than 10 mm.

The beverage, which may be coloured as distinct from white or water clear, may have bands, or stripes, across it at different heights, the bands possibly being white layers where nucleation is taking place, and beverage-coloured layers interposed between the white layers where less nucleation is taking place. This effect may be achieved by using ultrasound on the vessel, for example a glass, of beverage. The white bands and the interposed beverage-coloured bands may be of substantially the same thickness.

The white bands interspersed by beverage-coloured bands may exist for a matter of seconds, rather than minutes, and typically exist for 1 to 10 seconds, preferably about 3 to 6 seconds. The white bands/beverage-coloured bands interspersed may exist for substantially the same time as ultrasound is applied to the vessel of beverage.

Nucleation means may be provided to encourage the formation of the ice crystals and/or head in the beverage when it is in a vessel. The nucleation means is preferably the administration of ultrasound, preferably to the bottom portion of a vessel of beverage, but it could be other forms of nucleation inducement. For example the vessel and/or dispense tap/nozzle (or an object to be inserted into the vessel of beverage) may have a roughened surface/high surface area surface to encourage nucleation (such as a sintered surface, etched surface, or a surface of ground material, such as glass); or a rapid and suitably large pressure drop may be provided to induce nucleation; or mechanical agitation may be provided; or the beverage may be arranged to have turbulent flow to promote nucleation; or an amount of liquid, possibly highly supersaturated with gas, may be introduced or injected; or gas may be otherwise introduced, or injected, or the glass may be vibrated in some way (e.g. by being exposed to sound waves, or the vessel may be vibrated in some other way); or by introducing a chemical (e.g. tablet) or device which generates bubbles (for example a chemical pellet may effervesce or dissolve, releasing bubbles).

According to a second aspect of the invention there is provided a method of keeping an alcoholic beverage in an open-topped vessel cool, said beverage comprising a water content and a dissolved gas content, and said method comprising forming ice in the beverage in the open-topped vessel having a cooling effect on the beverage, said ice being formed in the beverage from water of said water content.

According to a third aspect of the invention there is provided a method of sustaining cooling ice in a beverage in an open-topped vessel, said beverage comprising a water content and a dissolved gas content, and wherein said ice is formed in the beverage from water of said water content, said method comprising providing a head of foam on the beverage such that in the vessel said ice is covered by the head which acts as heat insulation above the ice against heat directed towards the ice from above the head.

According to a fourth aspect of the invention there is provided a method of sustaining a head on beverage in an open-topped vessel, said beverage comprising a water content and a dissolved gas content, said method comprising providing a head on the beverage and forming ice in the beverage from water of said water content, and in said vessel said ice having a cooling effect on the head from below an upper part of the head.

According to a fifth aspect of the invention, there is provided an open-topped vessel of a beverage the beverage comprising a water content and a dissolved gas content and being able to form a head as the beverage is dispensed into the vessel, the vessel of beverage having a head overlying an ice formation made of many ice crystals, the ice formation having been produced by ice forming in the beverage as it was dispensed or after it was dispensed into the vessel.

Preferably the vessel has a transparent or translucent wall or at least has a window of transparent or translucent material.

Preferably the ice formation extends substantially the width of the mouth of the vessel, or completely across the width of the mouth. It may comprise substantially homogenous ice-crystals in a head-contacting region or layer. Alternatively, the ice crystals that contact the head may not be substantially homogeneous.

The ice formation may have a projection extending away from the head. The projection may comprise flakes of ice that are larger than the ice at the ice-head boundary.

The ice at the ice-head interface may have been formed before the ice flakes of the projection.

The beverage may have been subjected to ultrasound signals and may be draught beverage delivered into the vessel. Before the draft beverage is delivered into the vessel, and preferably immediately before, the beverage may be cooled to a temperature below the freezing point of water at ambient atmospheric pressure.

According to a sixth aspect of the invention there is provided a method of serving draught beverage in an open-topped vessel, said beverage comprising a water content and a dissolved gas content, and said method comprising cooling the beverage to a temperature below the freezing point of water at ambient atmospheric pressure, and delivering the cooled beverage into said vessel, said cooled beverage being subjected to the effect of ultrasound signals or to the effect of other ice and/or gas bubble nucleation means.

The ultrasound signals may be applied externally of said vessel, and/or the ultrasound signals may be applied internally of said vessel to the cooled beverage. In the latter case an ultra-sonic emitter provided as or incorporated into a probe may be disposed in the beverage in the vessel. If desired a dispense outlet or nozzle from which the beverage is delivered into the vessel may be adapted to act as an ultra-sonic emitter to provide aforesaid ultrasound signals to beverage in the vessel. Such signals may be applied to the beverage as it passes through the dispense outlet.

Ultrasound signals can be applied to beverage not only after it has been delivered into the vessel, but also whilst it is being delivered.

The ultrasound signals may have a frequency in the range of 20 kHz to 70 kHz. For example, the ultrasound signals may have a frequency of substantially 30 kHz.

A mass of aforesaid ice may develop downwards in the beverage below the head.

Preferably, the vessel is chilled before the beverage is delivered thereinto. The vessel may be chilled to a temperature of substantially 4° C., or the vessel may be chilled to a temperature less than 4° C. For example, the vessel may be chilled to a temperature of substantially 0° C.

Prior to the delivery, and preferably just prior to the delivery, a draught beverage may be cooled to a temperature in a range of between substantially −1° C. and substantially −12° C. and may issue at a temperature substantially in that range into the vessel. If desired, the beverage may be cooled to a temperature between substantially −4° C. and substantially −6° C. The greater the alcohol strength by volume (abv), the lower the temperature to which the alcoholic beverage may be cooled. We may aim to achieve a dispense temperature of about −5° C. for a lager (or other drink) with about 4.5 abv (or to substantially −4° C. or substantially −6° C.).

Preferably, the vessel has a wall portion of sufficient transparency to allow the contents of the vessel to be visible through said wall portion. Thus the vessel may be a glass drinking vessel.

Preferably the beverage is a pale colour for example the colour of a pale beer. If desired the beverage can be a lager, or a cider.

Aforesaid dissolved gas may comprise carbon dioxide and/or may comprise nitrogen. A dissolved nitrogen content in the beverage, for example an alcoholic beverage may be in the range of substantially zero parts per million (p.p.m) to substantially 100 p.p.m. For some beverages, for example certain lagers, substantially 40 p.p.m. A dissolved carbon dioxide content may approach zero % by volume or be greater. Said carbon dioxide may be substantially at any of the following levels or in a range defined between any of the following levels; zero vols/vol, 0.5 vols/vol, 1 vols/vol, 1.4 or 1.5 vols/vol, 2.0 vols/vol, 2.2 or 2.4 vols/vol, 3 vols/vol, 4 vols/vols or 5 vols/vol or above.

If desired, the ultrasound signals can be accompanied by a mechanically or electrically produced audible performance and/or a visible light display. The audible performance may be tuneful or musical sound. The visible light displays may comprise visible flashes of light.

If desired the beverage can be subjected to the ultrasound within an enclosure arranged to conceal the vessel from view from at least one side of said enclosure.

According to a seventh aspect of the invention, there is provided an alcoholic beverage comprising a water content and a dissolved gas content, wherein prior to being drunk said beverage is cooled to a temperature below the freezing point of water at ambient atmospheric pressure and delivered in a vessel to be drunk exposed to ambient atmospheric pressure, and wherein in said vessel aforesaid gas bubbles out of the beverage and at least a portion of said water content becomes ice.

According to an eighth aspect of the invention, there is provided an alcoholic beverage to be available on draught and comprising a water content and a dissolved gas content, wherein prior to being drunk the draught beverage is to issue, at a temperature below the freezing point of water at ambient atmospheric pressure, from an outlet into a vessel open to ambient atmospheric pressure so that aforesaid gas bubbles out of the beverage and at least a portion of said water content becomes ice.

If desired, the vessel which preferably may be a drinking vessel, can have a shape or formation to promote formation of the ice. For example, the vessel may have an internal surface to provide nucleation sites to promote formation of the ice. Said surface may have at least a surface portion which is roughened. At least a wall portion of vessel can be arranged to change colour automatically with variation in temperature. Said wall portion may comprise thermochromic material.

Desirably, the gas is a non-oxidising gas. This can avoid or at least slow deterioration of the beverage. The gas comprises carbon dioxide and/or nitrogen. By cooling the beverage and forming ice therein, this appears to, initially at least, reduce the rate of release of dissolved gas from the beverage, for example lager, and appears to improve the drinking sensation, taste, flavour or bite. We believe that this is a combination of the low drinking temperature (maintained by the ice) and the greater amount of retained gas in the beverage.

The presence of the ice can provide an interesting and attractive feature which can be particularly fascinating as the ice may expand at a noticeable rate throughout the beverage after the vessel is filled. To add to the interest, the ice may include therein one or more streaks or regions of one or more colours which contrast(s) with the colour of the ice and/or beverage.

The aforesaid ice may be, or may have, the character of slush.

According to a ninth aspect of the invention, there is provided a method of serving a draught alcoholic beverage which comprises a water content and a dissolved gas content, said method comprising issuing the draught beverage from an outlet into a vessel, prior to said issuing, storing or handling the beverage in a manner which impedes loss of the aforesaid dissolved gas from the beverage and cooling said beverage to a temperature below the freezing point of water at said ambient atmospheric pressure, and in said vessel aforesaid gas bubbles out of the beverage and at least a portion of said water becomes ice.

According to a tenth aspect of the invention, there is provided a method of providing a visual display or effect within a vessel having at least a portion of wall of some transparency, said method comprising providing a draught alcoholic beverage comprising a water content and a dissolved gas content, issuing the draught beverage from an outlet into a said vessel, prior to said issuing, storing or handling the beverage in a manner which impedes loss of aforesaid dissolved gas from the beverage and cooling said beverage to a temperature below the freezing point of water at said ambient atmospheric pressure and a visual display or effect developing in the beverage in the vessel, said visual display or effect comprising aforesaid gas bubbling out of the beverage and formation of ice due to at least a portion of said water becomes ice.

Formation of ice can develop in the vessel so as to increase the amount and extent of the ice from substantially an upper level of the beverage downwards through the beverage.

At least a wall portion of the vessel may change colour automatically with variation in temperature. Said wall portion may comprise thermo-chromic material.

An implement can be inserted into the beverage in the vessel to encourage formation of said ice. For example, the implement may be a thermometer, or it may be a swizzle-stick.

Colouring material or dye can be provided to form at least one coloured streak or region in the beverage and/or ice, the colour of said material or dye being in contrast to that of the ice and/or beverage so as to be visible.

The aforesaid implement may be used to add the colouring material or dye to the beverage and/or ice.

In one method, the beverage may issue at substantially −4° C. into the vessel and thereafter the temperature of the beverage in the vessel may rise almost immediately to at least substantially −3° C.

According to an eleventh aspect of the invention, there is provided a beverage dispense apparatus comprising cooling means adapted to cool a beverage to below 0° C., a dispense tap, and beverage dispense pipework adapted to convey the beverage to the dispense tap, the arrangement being such that the apparatus is adapted to dispense the beverage cooled to below the point at which ice would normally form in the beverage if the beverage were left standing at atmospheric pressure and if nucleation means were provided for the standing beverage, and in which the undispensed beverage in the apparatus does not freeze solid.

Preferably, the apparatus includes pump means and the beverage dispense pipework may include a portion which circulates beverage past the dispense tap when the dispense tap is closed, the fact that cooled undispensed beverage is kept flowing tends to prevent the formation of ice blockages at the dispense tap.

The beverage may be kept flowing past the dispense tap (or through it when it is open) at substantially all times that the beverage is at a temperature at which ice may otherwise form at the dispense tap or, in the beverage dispense pipework.

Preferably, there is a cold circulation loop in which is provided at least one cooling means and which is connected to the dispense tap, beverage in the circulation loop being kept cold by the cooling means and being kept circulating by pump means provided in the circulation loop. There may be a plurality of cooling means (e.g. heat exchangers) in the circulation loop. There may be a plurality of dispense taps associated with the circulation loop.

Preferably the circulation loop has sufficient volume for 1 pint or 2 pints of beverage.

Beverage upstream of the circulation loop may be cooled to a temperature about that at which ice may form in the beverage under the conditions of temperature and pressure experienced by the beverage in the pipework upstream of the circulation loop.

According to a twelfth aspect of the invention, there is provided apparatus to supply draught beverage, comprising beverage heat exchange means, a beverage outlet for cold beverage from said heat exchange means to issue from the outlet, openable and closable valve means to control supply of beverage to said outlet, and a beverage circulation loop for beverage to circulate in said loop.

The beverage can circulate in the loop when the valve means is closed. Preferably, the loop comprises pump means to circulate said beverage.

A purpose of circulating the beverage is to reduce the risk of or avoid freezing beverage blocking a beverage supply path to the outlet. Said loop may include a beverage flow passage in said heat exchange means.

In a preferred embodiment, the apparatus can comprise a unit or dispenser mountable on a counter of a drinks' bar and comprising the heat exchange means and the outlet.

A beverage flow path can connect a reservoir of the draught beverage to the heat exchange means. The flow path may comprise at least a portion of the loop.

The flow path may divide into a plurality of beverage routes, and the loop may comprise one or more of the routes.

Intermediate the reservoir and the first-mentioned heat exchange means. The beverage may be subject to the effect of second beverage cooling heat exchange means.

The reservoir may be subjected to cooling.

If desired, the second heat exchange means may act on at least a portion of the loop.

Coolant common to the first and second heat exchange means may circulate therethrough.

Beverage cooling heat exchange means may act on the beverage intermediate said reservoir and loop.

One advantage of a specific embodiment of the invention is that it enables us to provide cool beverage using ice therein in a way which a consumer may find more agreeable because dilution of the drink cannot occur. Another advantage may be that we can provide a beverage in which the existence of cooling ice therein may be sustained whereby the drink may be kept cold for an extended period of time.

A further advantage may be that we can provide beverage in which a head thereon may be sustained for a longer period of time than is achieved by the same beer dispensed at, say 6° C., or at say 4° C. using similar or the same dispense apparatus. Yet a further advantage of one embodiment of the invention is that it enables us to provide beer in which ice may develop therein as an interesting visual display.

It is extremely difficult to serve a glass of draught cider with a head of froth or foam so that the head lasts for any appreciable time.

Though it is possible to create a head by dispensing the cider from a font containing a sparkler, the head quickly disappears. Because the use of a sparkler slows the delivery rate of the cider, it takes longer to deliver a measured volume than if the sparkler were not used, and because the head quickly vanishes anyway some people think use of a sparkler pointless and take if off the font—sometimes without permission.

Another object is to provide a method of serving draught cider containing a dissolved gas content so that a head on the delivered draught cider in a vessel, for example a drinking glass, is more stable and remains for a longer period of time than a head on cider served by hitherto known methods.

According to a thirteenth aspect of the invention, there is provided a method of serving draught cider in an open-topped vessel and wherein said cider comprises a water content and a dissolved gas content, said method comprising cooling the cider to a temperature below the freezing point of water at ambient atmospheric pressure, and delivering the cooled cider into said vessel, said cooled cider being subjected to the effect of ultra-sound signals.

The cider may be cooled to a temperature in the range of substantially −1° C. to substantially −12° C. For example, the cider may be cooled to substantially −6° C. The greater the alcohol strength by volume the lower the temperature to which the cider may be cooled.

If desired, the cooled cider may issue from a dispense outlet through a sparkler. However, the cooled cider may pass through an orifice plate in a dispense outlet from which the cider issues.

Preferably the open-topped vessel is chilled before receiving the cider. The vessel may be chilled to substantially 4° C. or may be chilled to a temperature lower than 4° C. For example, the vessel may be chilled to substantially 0° C.

Said ultra-sound signals may have a frequency in the range of substantially 20 kHz to substantially 70 kHz. For example, the ultra-sound signals may have a frequency of substantially 30 kHz.

The ultra-sound signals can be applied externally of said vessel to said vessel.

The ultra-sound signals may be applied internally of said vessel to the cooled cider. Thus an ultra-sonic signal emitter may be disposed in the cider in the vessel for emitting ultra-sound signals into the cider in the vessel.

The dispense outlet from which the cooled cider issues into said vessel may be adapted to act as an ultra-sonic signal emitter to provide aforesaid ultra-sound signals. Aforesaid ultra-sound signals may be applied to aforesaid cider flowing through the dispense outlet.

The dissolved gas content may comprise carbon dioxide and/or nitrogen. The carbon dioxide may approach zero % by volume or be greater, and/or the nitrogen content may approach zero parts per million (p.p.m.) or be greater for example, the carbon dioxide content may be substantially 1.8% by volume and/or the nitrogen content may be substantially 18 parts per million (p.p.m.).

According to the fourteenth aspect of the invention there is provided cider in an open-topped vessel wherein said cider has a dissolved gas content and water content, and wherein said cider has a head of foam over ice, said ice being formed from water of said water content. In said cider according to said fourteenth aspect of the invention, said head and ice may be produced at least in part by performance of said method according to the thirteenth aspect.

According to a fifteenth aspect of the invention there is provided a method of sustaining a head on cider in an open-topped vessel wherein said cider comprises a water content and a dissolved gas content, said method comprising providing a head on the cider and forming ice in the cider from water of said water content, and in said vessel said ice forming a layer covered by said head. In said method according to the fifteenth aspect of the invention, said head and ice may be produced at least in part by performance of said method according to the thirteenth aspect.

According to a sixteenth aspect of the invention there is provided a method of preparing a drinking vessel to receive a beverage comprising providing a drinking vessel, introducing a potable liquid into the vessel, and cooling the potable liquid so that it freezes onto the vessel.

Preferably the vessel has a base and the liquid freezes onto the base. More preferably the vessel has sides and the liquid freezes onto the sides. The potable liquid may be directed into the vessel by means of a nozzle, for example as a spray.

Preferably the vessel is placed adjacent to heat extraction means which extracts heat from the vessel thereby to cool the potable liquid. The heat extraction means is preferably arranged to surround at least a part of the vessel. Preferably the vessel has a lower part and the heat extraction means is arranged to surround the lower part.

Preferably the vessel is rotated whilst the potable liquid is freezing. The rotating of the vessel may be arranged to displace some of the potable liquid outwards so that it has a non-level upper surface when frozen. Preferably the vessel has an axis which is arranged to be vertical if the vessel is upright, and the vessel is inclined so that the axis is non-vertical whilst the potable liquid is freezing. More preferably the vessel has a side and the liquid is poured against the side of the vessel so that it runs down the side of the vessel and freezes against it. Alternatively the vessel may be inverted and the potable liquid sprayed into the vessel.

The present invention further provides a method of serving a beverage comprising preparing a vessel according to the invention and dispensing beverage into the vessel. The beverage may be alcoholic, for example being selected from the group consisting of beer, and cider and may be a draught beverage.

The potable liquid may conveniently comprise a volume of the beverage. Alternatively it may be water.

The present invention further provides a method of serving a beverage comprising introducing beverage into a vessel having a lower portion and an upper portion, and cooling the beverage so that some of the beverage freezes onto the lower portion of the vessel while some of the beverage in the upper portion remains liquid. Preferably the beverage is cooled by cooling the lower portion of the vessel more than the upper portion.

The present invention further provides a method of serving a beverage comprising introducing a volume of a potable liquid and a volume of a beverage into a drinking vessel and cooling the potable liquid such that it freezes onto the vessel. The potable liquid may be frozen before the beverage is introduced into the vessel. Alternatively the potable liquid and the beverage may be introduced into the vessel at the same time.

The present invention yet further provides apparatus for preparing a vessel to receive a beverage comprising a supply arranged to supply a volume of potable liquid into a drinking vessel, and cooling means arranged to cool the potable liquid so that it freezes onto the vessel. Preferably the apparatus is for use with a vessel having a base, and the cooling means is arranged to cool potable liquid which is in contact with base so that the potable liquid freezes onto the base. More preferably the apparatus is for use with a vessel having a side, and the cooling means is arranged to cool potable liquid which is in contact with side so that the potable liquid freezes onto the side.

Preferably the supply includes a nozzle for directing the potable liquid into the vessel. The nozzle may be arranged to direct potable liquid into the vessel as a spray.

Preferably the cooling means is arranged to extract heat from the vessel thereby to cool the potable liquid. For example the cooling means may be arranged to surround at least a part of the vessel.

Preferably the apparatus includes rotating means arranged to rotate the vessel whilst the potable liquid is freezing. More preferably the rotating means is arranged to rotate the vessel so as to displace some of the potable liquid outwards so that it has a non-level upper surface when frozen. Still more preferably the apparatus is arranged for use with a vessel having an axis which is arranged to be vertical if the vessel is upright, the apparatus being arranged to support the vessel such that it is inclined so that the axis is non-vertical whilst the potable liquid is freezing. Yet more preferably the apparatus is arranged for use with a vessel having a side, the apparatus including a nozzle arranged to dispense the potable liquid against the side of the vessel as the vessel is rotated. Alternatively the apparatus may be arranged to support the vessel in an inverted position while the potable liquid is sprayed into the vessel.

Preferably the apparatus includes a supply of beverage, the apparatus being arranged to dispense the beverage into the vessel. The supply may be arranged to supply the beverage as draught beverage. Preferably the supply is arranged to supply the potable liquid and the beverage from the same source so that the potable liquid is a volume of the beverage.

The present invention further provides apparatus for serving a beverage comprising a supply for introducing beverage into a vessel having a lower portion and an upper portion, the apparatus including cooling means arranged to cool the lower portion of the vessel so that some of the beverage freezes onto the lower portion of the vessel while some of the beverage in the upper portion remains liquid. Preferably the cooling means is arranged to cool the lower portion of the vessel more than the upper portion.

The present invention still further provides apparatus for serving a beverage comprising a supply arranged to introduce a volume of a potable liquid and a volume of a beverage into a drinking vessel and cooling means arranged to cool the potable liquid such that it freezes onto the vessel.

The present invention further provides a drinking vessel which has been prepared to receive a beverage according to the method of the invention. Preferably the vessel has a layer of frozen potable liquid on a surface thereof. More preferably the vessel has a side and the layer of potable liquid is frozen to the side of the vessel. To achieve good cooling of a beverage, the layer of liquid preferably covers a substantial portion of the side of the vessel. Alternatively if the vessel is to be stored for some time before the beverage is introduced into it, it may be preferable for the frozen liquid to be formed in the bottom of the vessel where it will melt less quickly.

The present invention yet further provides apparatus for preparing a drinking vessel having a surface for receiving a volume of beverage, the apparatus comprising a supply of potable liquid arranged to direct the potable liquid onto the surface of the vessel, and cooling means arranged to produce cooling of the potable liquid so that it freezes onto the surface.

The present invention still further provides a cooled beverage presented in a drinking vessel having a side, the vessel having ice formed of frozen potable liquid on said side. Preferably the beverage presented in the vessel is similar to the potable liquid which is frozen to form said ice.

The beverage may be non-alcoholic or alcoholic. An alcoholic beverage may be a beer, for example a lager or an ale, stout or porter, or the alcoholic beverage may be cider.

The invention will now be further described by way of example with reference to the accompanying drawings in which:

FIGS. 2 to 4 show diagrammatically in elevation a drinking vessel filled with draught beverage delivered by the apparatus in FIG. 1 to illustrate successive changes or variations in the beverage after delivery thereof into a drinking vessel;

Figure 1:
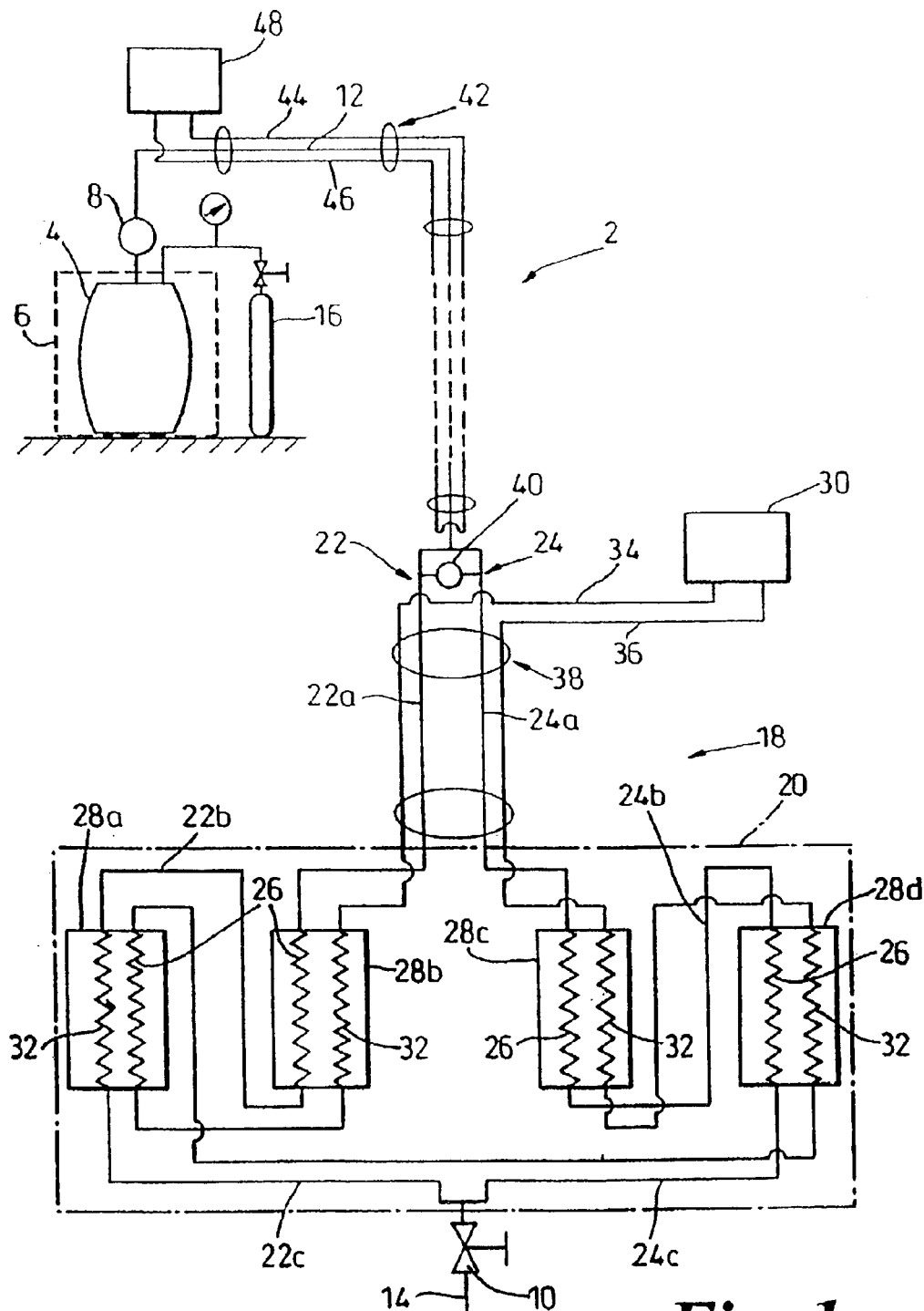
FIG. 1 is a diagrammatic view of apparatus for delivering cooled draught beverage.
Figures 8, 9:
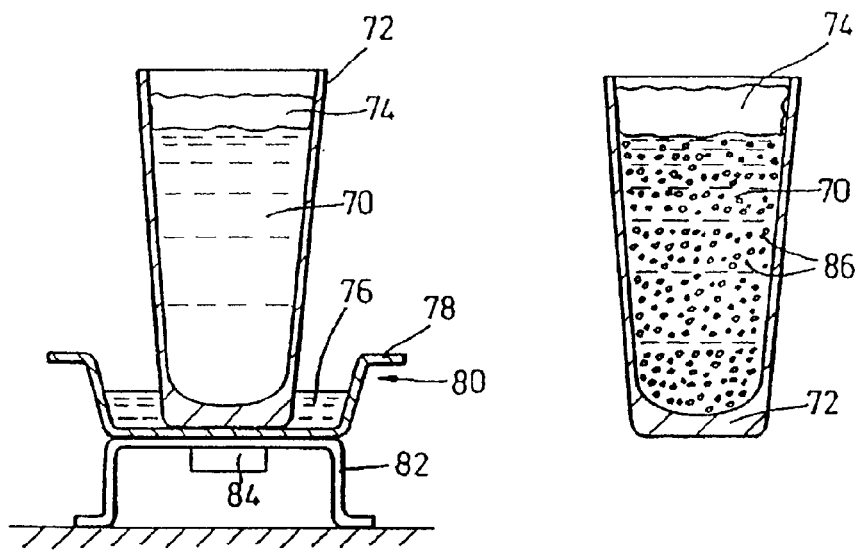
Figure 18:
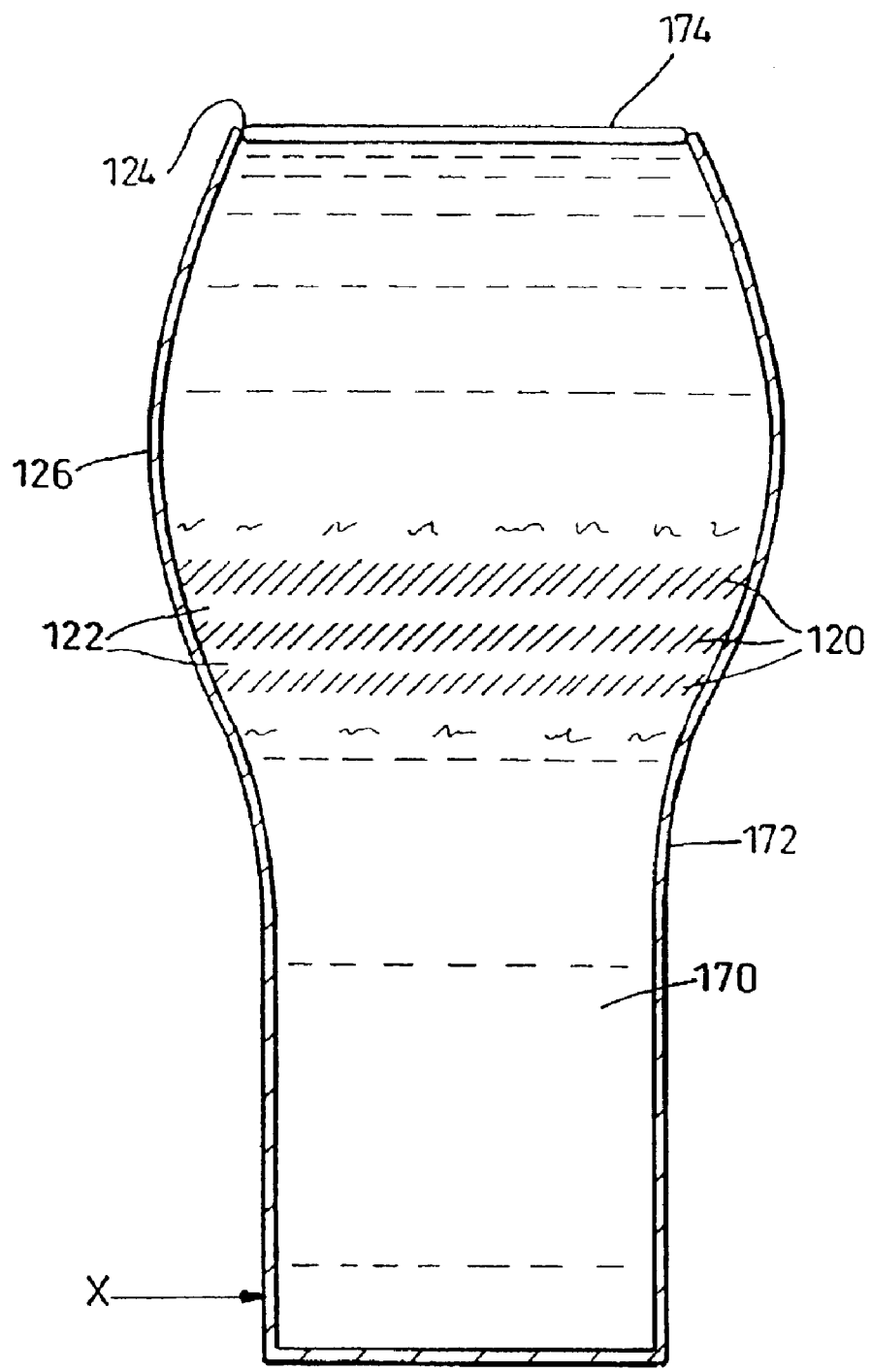
Figure 19:
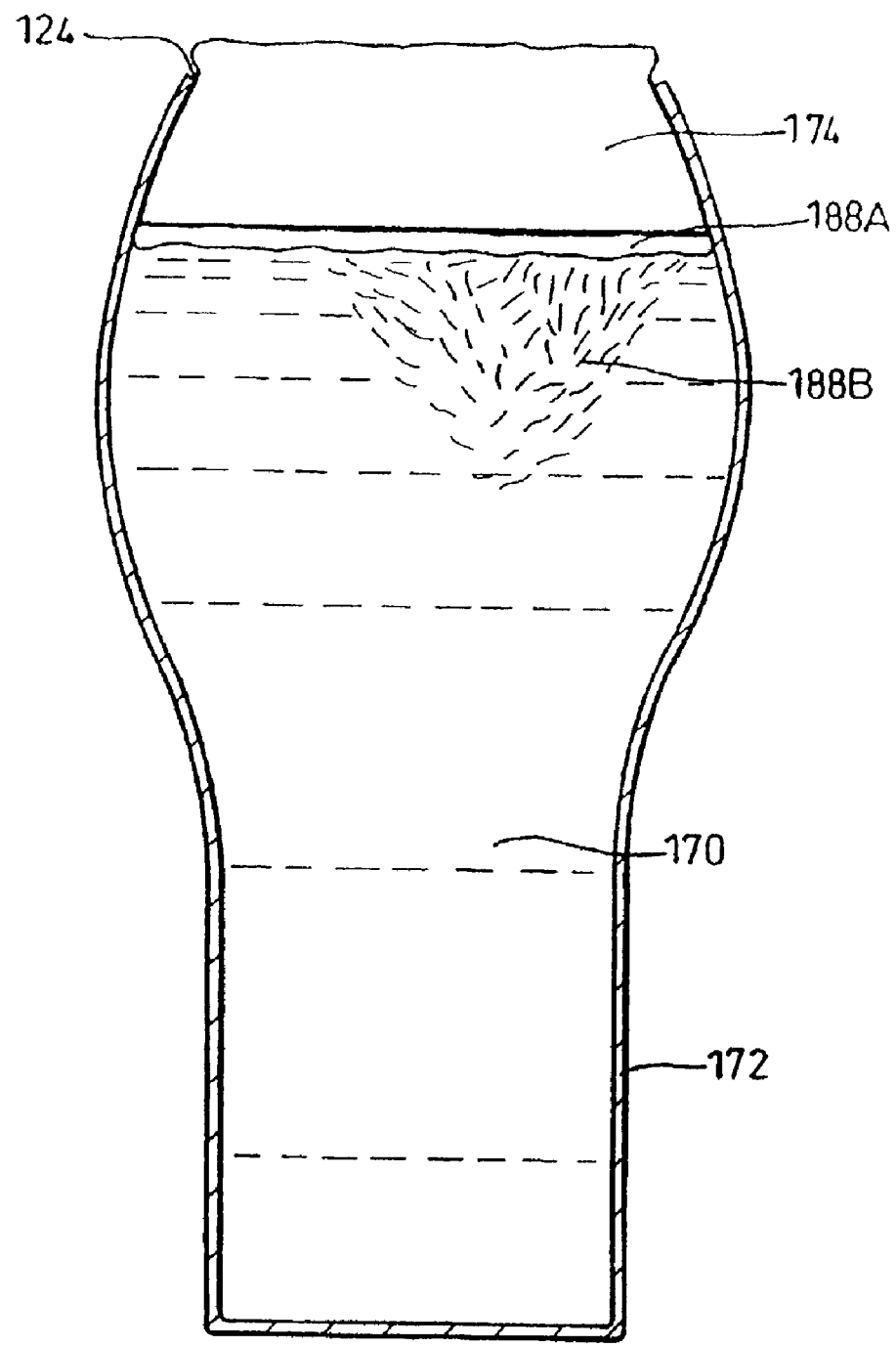
Figure 20:
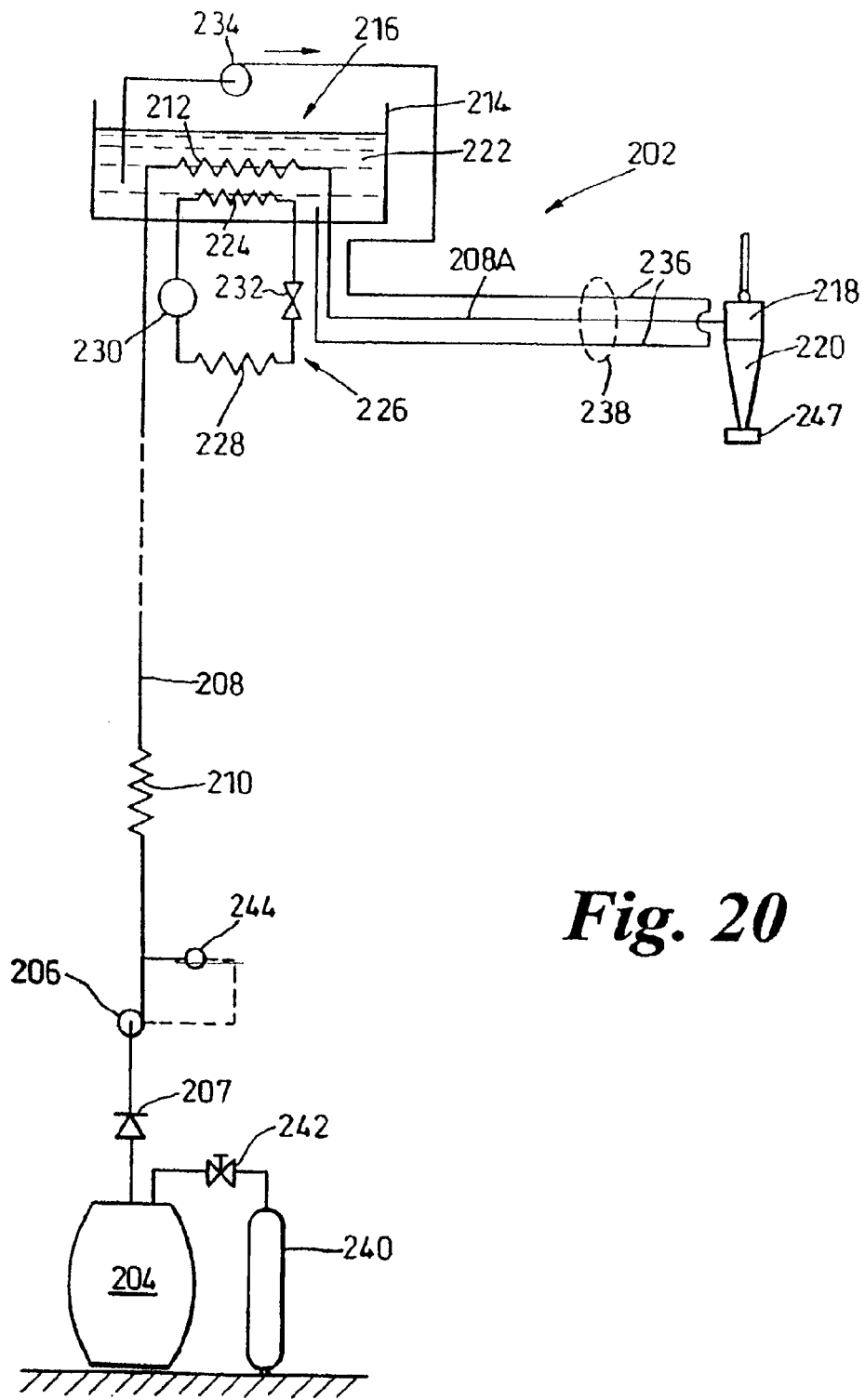
Figure 26:
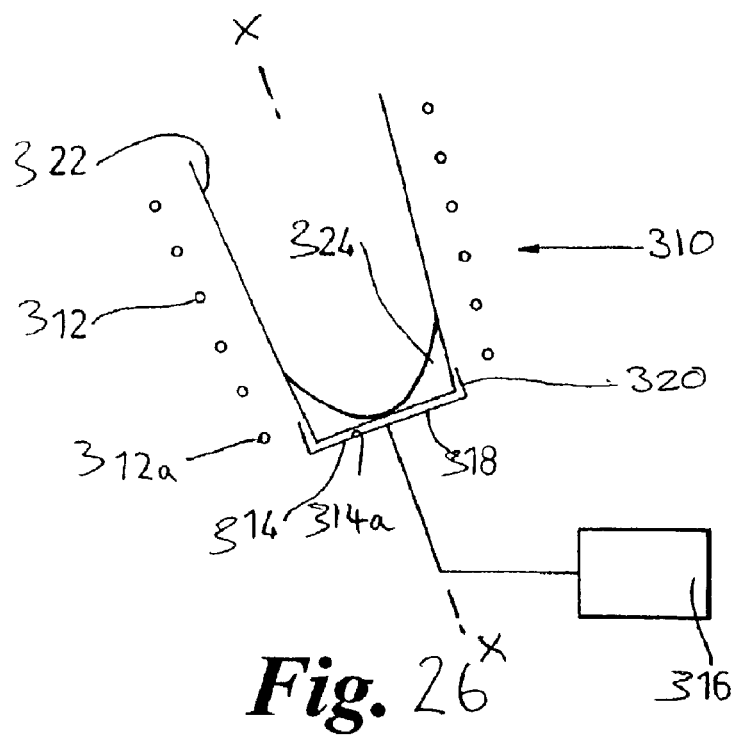
Figure 27:
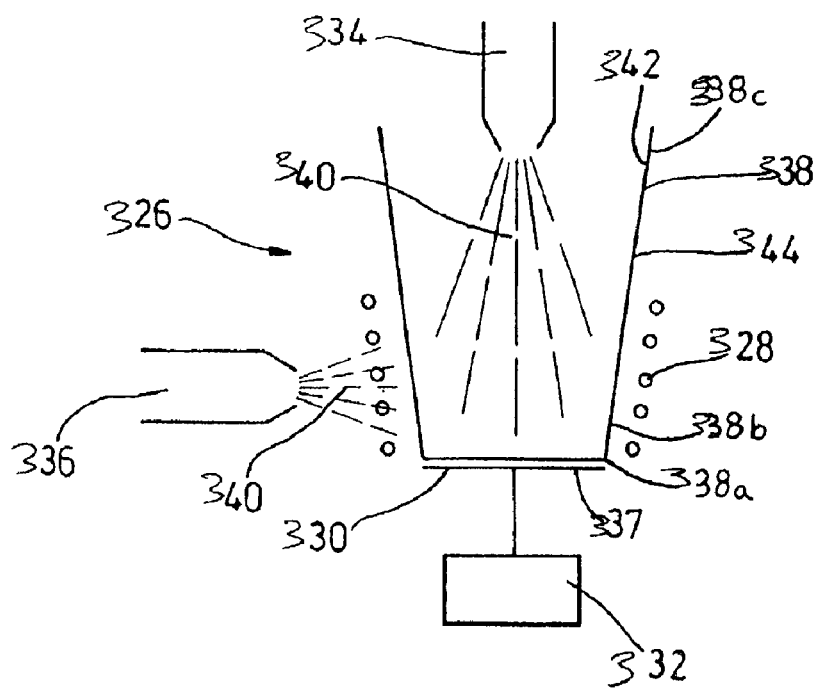
Figure 28:
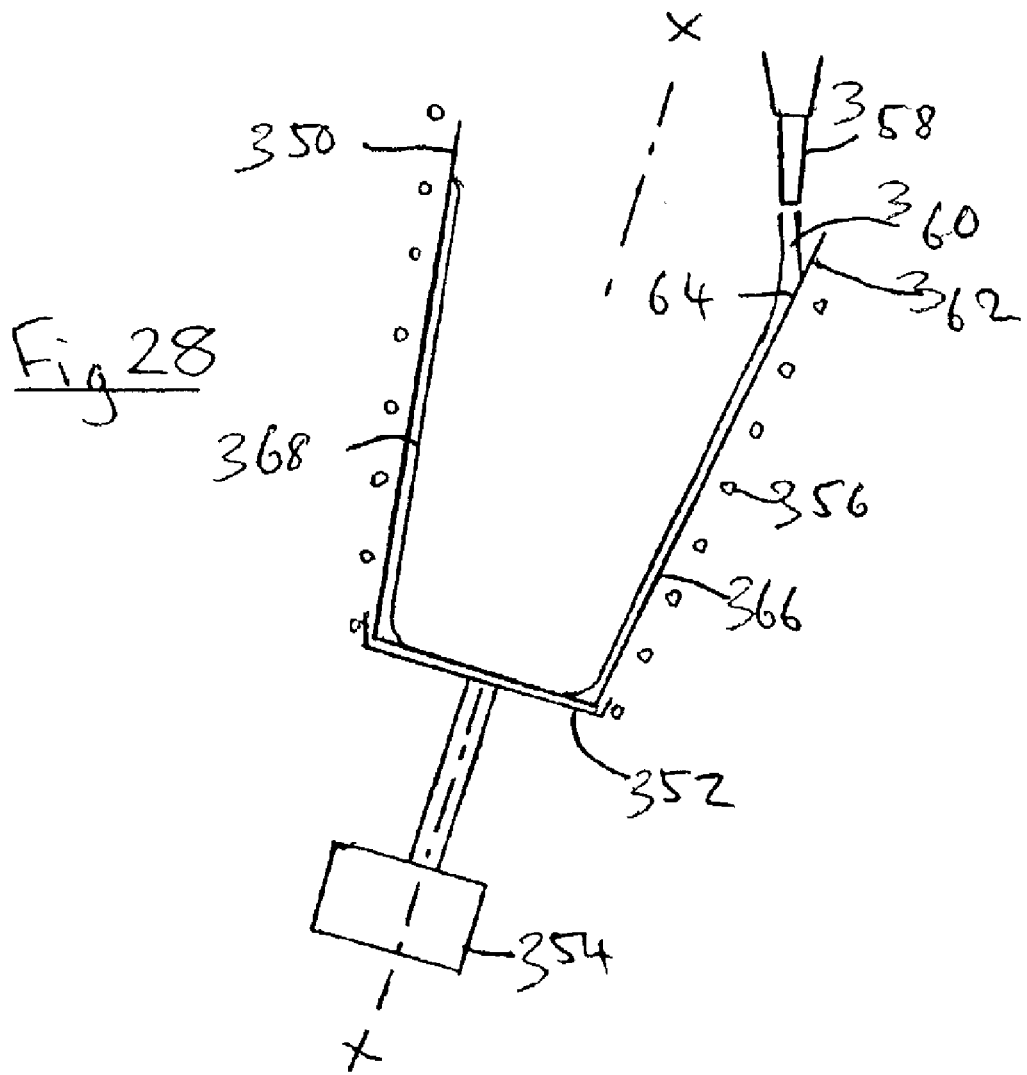

FIGS. 5 to 7 respectively shows diagrammatic side elevations illustrating modifications in the way the delivered beverage may be served in the drinking vessel;

FIG. 8 is a diagrammatic view showing in elevation a drinking vessel filled with a beverage delivered by the apparatus in FIG. 1, the vessel being shown standing on apparatus represented diagrammatically to apply ultrasound signals to the beverage;

FIGS. 9 to 15 show diagrammatically in elevation successive changes in the development or variations in a head on the beverage subsequent to the beverage being subjected to ultrasound signals and also to development or variation in ice formed in the beverage;

FIG. 16 is a diagrammatic view of an alternative method of applying ultrasound signals to the beverage;

FIG. 17 is a diagrammatic view of yet a further method of applying ultrasound signals to the beverage;

FIG. 18 shows a pint of lager being excited by ultrasound;

FIG. 19 shows the pint of lager in FIG. 18 after it has been allowed to stand for three minutes;

FIG. 20 is a diagrammatic view of apparatus for delivering cooled draught cider;

FIG. 21 is a diagrammatic view showing in elevation a drinking vessel filled with cider delivered by the apparatus in FIG. 20, the vessel being shown standing on apparatus represented diagrammatically (and similar to that in FIG. 8) to apply ultra-sound signals to the cider;

FIGS. 22 and 23 shows diagrammatically in elevation successive changes in the development of the variations in the head on the cider subsequent to the cider being subjected to ultra-sound signals and also to development of or variations in ice formed in the cider;

FIG. 24 is a diagrammatic view of an alternative method of applying ultra-sound signals to the cider;

FIG. 25 is a diagrammatic view of yet a further method of applying ultra-sound signals to the cider;

FIG. 26 shows an embodiment of a drinking vessel cooling apparatus according to the present invention;

FIG. 27 shows another embodiment of a drinking vessel cooling apparatus according to the present invention;

FIG. 28 shows a further embodiment of a drinking vessel cooling apparatus according to the present invention;

FIG. 29 is a diagrammatic view of a method of cooling a beverage post-dispense;

FIG. 30 is a diagrammatic view of an alternative method of cooling a beverage post-dispense; and FIG. 31 is a diagrammatic view of yet a further alternative method of cooling a beverage post-dispense.

The draught beverage is stored in a keg or cask 4 which may be made of metal. The cask 4 can be stored in a cold-room known per se in public houses or clubs and/or, if desired, in a more specific cold or cooled enclosure 6, for example a tank containing a chilled mixture of water and ethylene glycol. As stated above the beverage has a water content and a dissolved gas content. This gas may be any suitable non-oxidising gas, for example carbon dioxide and/or nitrogen. The amount of gas dissolved in the beverage may be within the usual known range for beverages, and the pressure within the cask 4 and the remainder of the supply apparatus (described below) may also be within the usual known range for beverages supplied on draught.

The beverage may be a beer which term includes lager, ale, porter, or stout, or may be cider. The dissolved carbon dioxide content may be greater than substantially 1 vols/vol or 2 vols/vol and may be substantially 2.2 volumes per volume, and/or the dissolved nitrogen content may be substantially 25 p.p.m. to 35 p.p.m. If desired the carbon dioxide content may be substantially 4 vols/vol or substantially 5 vols/vol. The alcohol content may be between 2.5% abv to 6 or 7% abv, preferably 4.5% abv, ±1% abv.

The beverage may be a flavoured alcoholic beverage.

A pump 8, arranged to operate substantially only when the manually operable valve 10 is open, is provided to pump beverage from the cask 4 along a pipe 12 ultimately to the valve 10 and a dispense outlet 14 therefrom. In known manner, a blanket or atmosphere of non-oxidising/pressurised gas (for example carbon dioxide and/or nitrogen) is provided in the cask 4 from a suitable supply 16 and assists the pump 8 in the extraction of the beverage.

A beverage dispense unit is indicated generally at 18 and has a cover indicated by interrupted lines 20. The dispense unit may be mounted at or in the vicinity of a drinks' bar—for example on the top of, or incorporated into, a counter of the bar.

In proximity to the cover 20 the pipe 12 divides into two flow paths 22 and 24, each leading to the valve 10. One is formed by piping 22a, 22b, 22c and passages 26 in heat exchangers 28a and 28b, and the other is formed by piping 24a, 24b, 24c and passages 26 in heat exchangers 28c and 28d.

A chiller unit 30 circulates coolant through passages 32 in the heat exchangers 28 in the series by a system comprising a coolant flow pipe 34 and a coolant return pipe 36. Beverage pipes 22a and 24a can be bundled together in known manner with the coolant pipes 34 and 36 to form a python 38. The heat exchangers 28 may be plate heat exchangers.

A circulation pump 40 which may operate continuously, extends between the flow paths 22 and 24 adjacent to the junction between the pipe 12 and the flow paths. Thus, the flow paths 22, 24 and the pump 40 form a circulation loop 22, 24, 40 around which beverage is continuously circulated when valve 10 is closed.

As suggested in FIG. 1, in the beverage dispense unit 18, the heat exchangers 28 are within the cover 20, whilst the valve 10 and outlet 14 can be on its exterior, and a portion of the circulation loop comprised by the pump 40 and sections of pipes 22a and 24a is also external of the cover and may be exposed to ambient temperature at the bar.

If desired, the pipe 12 may be incorporated in know manner into another cooling python 42 comprising flow and return pipes 44 and 46, carrying coolant from and back to a chiller unit 48.

Overall, the beverage arrangement—and particularly that provided by the dispense unit 18 by the heat exchangers 28—so cools the beverage that the beverage issuing from the outlet 14 when valve 10 is opened is at a temperature below the freezing point of water at the ambient atmospheric pressure. For example the beverage may issue at a temperature in the range of substantially −1° C. to substantially −12° C. into a drinking vessel or drinking glass. The range may be substantially −4° C. to substantially −6° C. A target temperature of −5° C. is aimed for if we use a beverage with about 4.5% abv.

When the valve 10 is closed, the beverage is circulated automatically around the loop 22, 24, 40 so it cannot stand still and start to freeze and block the supply path to valve 10.

In the case of draught beverages, for example beers, conventionally served with a head, the outlet 14 may include a known orifice plate, or other device, to promote foaming.

With reference to FIG. 2, when a draught beverage 50 is delivered from the outlet 14 (FIG. 1) into a drinking vessel 52 (for example a glass) the beverage is exposed to ambient atmospheric pressure and ambient or room temperature, the beverage temperature starts to increase, for example to −3° C. Almost immediately, a slug of ice 54a forms near the top of the vessel 50 at the upper level of the beverage, the ice being caused (we believe) as a result of nucleation sites resulting from the forming of bubbles of dissolved gas. If the beverage 50 has a head 56 of foam the ice forms just below the head. The or a greater part of the ice may be in the nature of slush and is formed from the water already forming the beverage. The slug of ice grows as indicated at 54b in FIG. 3 and 54c in FIG. 4 until it may substantially occupy the vessel 52. The growth of ice (in, say, a pint glass) can be accomplished in a minute or two, is fascinating to watch and can give rise to interesting visual effects based on the growth of the ice and the bubbling off of the gas. Another interesting visual effect is that cooled beverages delivered into a drinking vessel from the apparatus in FIG. 1 swirl in the vessel for a longer time period than beverages which have not been cooled.

The amount of ice formed in a dispensed beverage is determined by the amount of latent heat available, and depends, amongst other things, on the dispense temperature and the glass temperature.

In particular, in some embodiments 1 g to 15 g of ice may form in a pint of dispensed draught beverage. In the preferred dispense temperature range of −4° C. to −6° C. between 5 g and 13 g of ice may typically form. Preferably, if the beverage is dispensed at substantially −4.6° C. into a glass cooled from an ambient temperature of substantially 25° C. to less than 5° C., of the order of 9 g or 10 g of ice may form.

Preferably the ice is formed from 0.5% to 3% of the water content of the beverage. More preferably the ice is formed from 1% to 2% of the water content of the beverage.

Not only does the formation of the ice give rise to interesting visual effects, but the existence of the ice helps to keep the drink cool longer. Also, since the ice is formed from the water in the beverage, the beverage is not diluted by the ice. In fact, for an alcoholic beverage, the overall amount of alcohol remains the same in the container when the ice forms, but since water is being used for the ice, the alcoholic strength of the remaining liquid beverages increases until the ice melts.

The vessel 52 may be shaped or formed to encourage formation of the ice. In FIG. 5, a region 58 (having a rough surface) is provided to encourage formation of nucleation sites to promote formations of a further ice slug 54d which rises as indicated by arrow A to enlarge the ice slug 54 developing from the top of the vessel 52.

In FIG. 6, formation of further ice 54e in the body of the beverage 50 is encouraged by the insertion therein of an elongate implement or rod 60 represented in FIG. 6 by a swizzle-stick having formations 62 and 64 at its lower end and shank respectively which further encourage development of nucleation sites. In another instance, the rod 60 may be a thermometer body which can also be used to take the temperature of the drink to see if it has risen sufficiently high for it to be safe to drink. The implement can be used to push the ice around.

In FIG. 7, coloured regions or streaks 66 are shown in the ice 54 and beverage 50. These coloured formations are formed by the release of non-toxic, edible, colouring materials or dyes into the beverage 56. The colouring material or dye, which stands out visually from the ice and beverage, may be injected into the beverage, or may be introduced into the beverage by or on the aforesaid implement.

It is preferable for the vessel 52 to have a wall of sufficient transparency so that the formation of the ice slug 54 in the beverage 50 can be observed and its changing nature visually appreciated.

The drinking vessel 52 can be formed of, or have external surface areas formed of, material (for example thermochromic material) which automatically changes colour with temperature change. Apart from this being a further interesting visual effect, the attainment of one particular colour may signal that the beverage is at a suitable temperature for drinking.

Whilst any kind of beverage having a water and dissolved gas content may be used, we believe that lager demonstrates a visual nature or character of the invention.

With reference to FIG. 8, a draught beverage 70 (which may be a beer, for example a lager) is delivered from the outlet 14 (FIG. 1) into a drinking vessel 72, for example a glass which is preferably rather tall and preferably has a clear or transparent wall.

Preferably, the vessel 72 is chilled before it received the beverage. The vessel 72 may be chilled to a temperature of substantially 4° C. or less. For example a known bottle chiller may be used to chill the vessel 72 to substantially 4° C. whilst a known glass froster may chill the vessel to substantially 0° C. A head of foam is shown at 74 and preferably this is some way below the top of the vessel 72 when the vessel contains a full measured volume, for example a pint of the beer.

Immediately after the cold beverage is poured into the chilled vessel 72 (or a few seconds after), the vessel is placed in a shallow depth of water 76 in a dish part 78 of an ultrasound generating apparatus 80 in which the dish 78 is securely mounted or affixed against a base part 82 containing an ultrasonic emitter 84. The emitter 84 may be arranged to emit ultrasound signals in a frequency range of substantially 20 kHz to 70 kHz. For example the beverage may be subject to ultrasound signals of a frequency of substantially 30 kHz or some other frequency selected from the aforesaid range, the water layer 76 providing an ultrasound for any desired period, though usually a short period of a few seconds, for example substantially one to five seconds and more specifically about three or four seconds. The user may be able to vary the length of time that the ultrasound is applied, for example by having to hold down a switch, or by altering the setting on a control.

Figures 10, 11, 12:
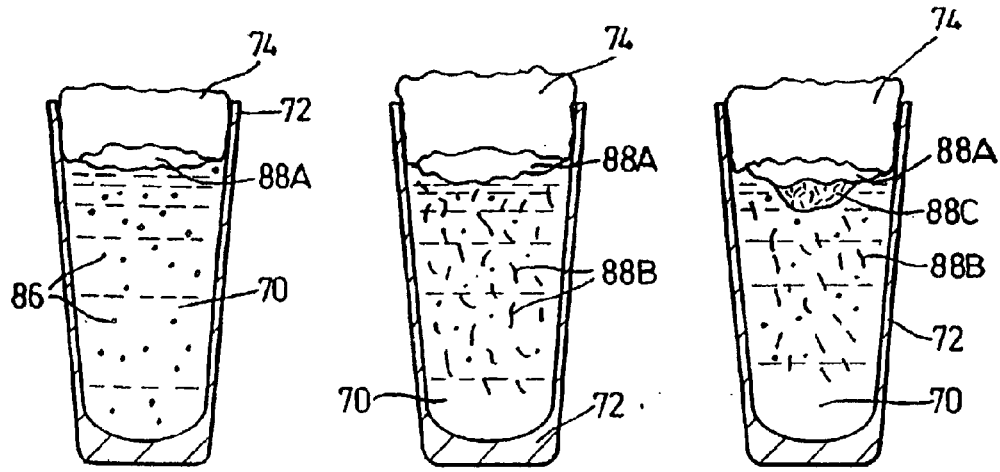

The result in a short time (perhaps a few seconds to the order of ten seconds) is shown in FIG. 9 in which the exposure to ultra-sonic signals has promoted a fairly dense sudden formation of a mass of bubbles 86 of the dissolved gas throughout the liquid beverage. This causes the head 74 to increase in height. As shown in FIG. 10, the head 74 may rise out of the vessel 72. The gas bubbles form nucleation sites encouraging the quick formation of a mass of ice 88A just below the head. This ice 88A may be of a rather slushy character. For a period the mass of slush 88A grows and the head 74 rises as shown in FIG. 11 but the bubbles of gas are no longer so numerous. Nevertheless, they can act as nucleation sites encouraging thereat the formation of ice 88B in the body of the beverage, this ice 88B may be more in the nature of flakes, for example snow type flakes, which rise and agglomerate to form a flaky mass 88C of ice on the underside of the slushy ice mass 88A. As indicated in FIG. 12 and 13 the ice flakes continue to form for a period, rise and extend the ice mass 88C downwards through the beverage 70.

Going from the stage shown in FIG. 8 to that in FIG. 14 may only take one or two minutes so the increase in gas bubbling and the formation and visible development of the ice takes place fairly quickly and can be an interesting and rather amazing phenomena to observe through the glass 72.

To enhance the theatre, drama or wonder of the event for a customer at the drinks' bar the operation of the apparatus 80 may be accompanied by an automatically (or manually actuated) occurring audible performance which may be mechanically or electrically produced using sound apparatus giving out dramatic, musical or tuneful sounds. In addition to, or as an alternative, the operation of the apparatus 80 may be, possibly automatically, accompanied by a visual lights display, for example visible flashes of light. These may stimulate flashes of lightening. In that case the audible performance may comprise noise resembling thunder.

If desired, the vessel 72 when subject to the ultrasound may be concealed from the view of the customer in a bar. For example, it may be concealed from view on one or more sides in an enclosure which may be on the counter or proximate thereto, which enclosure may be represented as a "magic" or magician's box or cabinet.

Preferably, the beverage is a pale colour. For example the beverage may be a pale coloured beer, for example a lager.

Besides the ice forming in the beverage 70 being an intriguing sight, it helps show the customer the beverage is cold and that it has not been diluted by addition of ice from water other than that of the beverage.

The good head 74 provides insulation of the ice, particularly from overhead heat, which helps sustain the ice for longer and thus the duration of its cooling effect. Also the ice below the head 74, helps sustain the existence of the head which may last for ten minutes, fifteen minutes or most preferably for twenty minutes or so.

In FIG. 15, the head 74 though starting to collapse (at its centre and move away from the vessel's wall) after the elapse of some time, for example fifteen or so minutes, is still stubbornly remaining, insulating the ice and giving the beverage an attractive presentation in the vessel 72.

An alternative method of applying the ultrasound signals is represented in FIG. 16 in which after the apparatus 2 in FIG. 1 has dispensed a vessel or glass 72 of beverage 70 an ultrasound probe 90 powered through cable 92 is dipped into the beverage for emitter 84A to give out ultrasound signals. The probe 90 may be inserted into the beverage before the full measured amount is supplied to the vessel.

In FIG. 12, the dispense outlet 14 has been arranged to act as an ultrasonic probe, for example by providing it with an ultrasonic emitter 88B.

The ultrasound probe 14 in FIG. 12 may emit ultrasound signals whilst beer is passing through it to the vessel 72, and/or may become partially immersed in the beverage as shown and emit ultrasound signals into the beverage 70 in the vessel 72 whilst the measured volume of beverage is still being supplied or after it has been supplied.

FIG. 18 shows another glass 172 (for example a pint) of beverage 170 in this case lager, being excited (as indicated by arrow X) at the base only by an ultrasound emitter, for example by standing the glass of beverage in couplant (water) for example as shown in FIG. 8. FIG. 18 shows the glass 172 after it has been excited by the ultrasound for about three seconds or so, and whilst it is still being excited by ultrasound and whilst a head 174 of foam is beginning to form. As will be seen, in addition to general bubble formation at a relatively modest level throughout the volume of the beverage 170, there is increased activity in a series of horizontal "white bands" about half-way up the height of the glass 172. Interspersed between the white bands 120 are bands 122 which are less white-coloured i.e. more beer or lager coloured. There are typically two to four white bands 120 visible, but increased bubble formation may occur above and below the "banded region" 120, 122.

The formation of the bands 120, 122 gives the glass of beverage an attractive appearance for the few seconds that they last. It is believed that they may be associated with the formation of standing waves in the glass 172 due to the ultrasound excitation, and may represent areas of the glass which might vibrate the most (although this belief is speculative and is not to be held to be limiting). The bands 120, 122 may form generally in the central height of the glass, but they may not be right at the middle—for example, they could be one-third to two-fifths of the way down from the top (or up from the bottom).

It should also be noted that the glass 172 of FIG. 18 has a mouth 124 that is narrower than a body portion 126. It is believed that having a restricted mouth forms a deeper and longer-lasting head. This may, or may not be associated with the fact that in comparison with the volume of beer contained a glass with a restricted mouth has a smaller exposed surface area of head than if it were in a vessel with straight sides, or outwardly flared sides.

Our trials indicate that best/better results can be achieved on pints of beverage than on half-pints of beverage. This may be associated with greater heat capacity of a pint of beverage in comparison with a half-pint of beverage, and the less effect exposure to the environment has/the less rapid the effect of the heat transfer to the local environment, when the ratio of volume of beverage; exposed surface is larger.

FIG. 19, illustrates the pint of lager of FIG. 18 after about three minutes have expired (or looked at another way after about ten minutes have expired—there is little change in the appearance of the glass of lager between the three minutes and the ten minutes). The head 174 is somewhat deeper than might be expected, and slightly projects above the glass 172. There is a relatively thin layer of ice 188A (of the order of a half to a few millimetres) extending under the head completely across the diameter of the glass 172 and there is a depending projection of flaky ice 188B extending down perhaps two to five centimetres into the cleared beer. The projection 188B may extend for at least three centimetres, five centimetres is not to be taken as necessarily an upper limit to its length. The projection 188B is generally central, but may be off-axis in comparison with the central axis of the glass. It has a narrower tip than it does base (the base being the portion adjacent the head 174).

It will be appreciated that creating a beverage having such an ice formation is in itself new and itself gives a visually differentiated product—which is desirable to consumers.

Moreover, creating the bands or stripes during ultrasonic excitation of the glass of beverage also creates a visually distinct product, and a differentiated mode of provision of the product to the consumer.

With reference to FIG. 20 apparatus to supply cider on draught is indicated at 202.

The draught cider is stored in a keg or cask 204. As stated above, the draught cider has a water content and a dissolved gas content.

This gas may be any suitable non-oxidising gas, for example carbon dioxide and/or nitrogen. The amount of gas dissolved in the cider may be within the usual known range for ciders.

The dissolved carbon dioxide content may be substantially 1.8% by volume, and/or the dissolved nitrogen content may be substantially 18 parts per million (p.p.m).

A pump 206 is provided to pump cider from the cask 204 through a non-return valve 207 and along a pipe 208 in a chilled python known per se (not shown); the pipe comprising a heat exchange coil 210 in a remote cooling system known per se. The pipe 208 leads to a chilling coil 212 in a bath 214 of a chiller 216, from which coil a pipe 208A leads to a manual valve 218 (known per se) of a dispense outlet or nozzle 220 which may be provided at or on a drinks' bar. Bath 214 contains an ethylene glycol and water cooling mixture 222, for example 50% glycol and 50% water. The cooling mixture 222 is cooled by an evaporator 224 of a refrigeration unit 226 comprising a condenser 228, a refrigerant pump 230, and an expansion arrangement 232. A pump 234 circulates the cold mixture 222 through piping 236 forming another python 238 with the pipe 208A.

In known manner, a blanket or atmosphere of non-oxidising gas (for example carbon dioxide and/or nitrogen) from a suitable supply 240 (via a pressure regulator 242) provides a top pressure in the cask 204 and assists the pump 206 in the extraction of cider.

The top gas pressure in the cask 204 may be substantially 206.84 $kN/m^2$ (30 $lbs/in^2$).

The pump 206 may develop a pressure in pipes 208, 208A of substantially 517.12 $kN/m^2$ to substantially 551.58 $kN/m^2$ valve (75 to 80 $lbs/in^2$). Normally pump 206 is not operating, thus when the valve 218 is opened the pump pressure stored in the pipes 208, 208A drops to below a pre-determined desired value which is observed by pressure switch 244 of a pump control (not shown) causing the pump 206 to operate to provide a pump output pressure of substantially 75 to 80 $lbs/in^2$. The chiller 216 is arranged to cool the cider passing through to the outlet nozzle 220 to a pre-determined temperature in the range of substantially −1° C. to substantially −12° C., for example −6° C. The cider reaches the nozzle 220 at that pre-determined temperature and issues therefrom into an open-topped vessel 246 (FIG. 21) which may be a drinking vessel, for example a drinking glass. In FIG. 20 the cider issuing from the outlet opening of the outlet nozzle 220 passes through a sparkler 247 (known per se). Instead of or in addition to said sparkler 247, a known orifice plate may be mounted in nozzle 220. But if desired, neither an orifice plate nor a sparkler may be fitted.

When valve 218 is closed, the pressure switch 244 observes a build-up in pressure in the pipes 208, 208A above a predetermined value and the control switches off the pump 206.

With reference to FIG. 21, the draught cider 248 is delivered from the outlet 220 (FIG. 20) into the drinking vessel 246, for example a glass which is preferably rather tall and preferably has a clear or transparent wall. Preferably the vessel 246 is chilled before it receives the cider. The vessel 246 may be chilled to a temperature of substantially 4° C. or less. For example a known bottle chiller may be used to chill the vessel to substantially 4° C. whilst a known glass froster may chill the vessel to substantially 0° C. A head of foam is shown at 250 when the vessel contains a full measured volume, for example a pint, of the cider.

Immediately the cold cider 248 is poured into the chilled vessel 246, the vessel is placed in a shallow depth of water 252 in a dish part 254 of an ultra-sound generating apparatus 256 in which the dish 254 is securely mounted or affixed against a base part 258 containing an ultrasound emitter 260. The emitter 260 may be arranged to emit ultra-sound signals in a frequency range of substantially 20 kHz to 70 kHz. For example the cider may be subject to ultra-sound signals of a frequency of substantially 30 kHz or some other frequency selected from the aforesaid range, the water layer 252 providing an ultra-sonic transmission path or coupling. The cider 248 may be subject to the ultra-sound for any desired period, though usually a short period of a few seconds, for example substantially one to five seconds and more specifically about five seconds.

The result in a short time is shown in FIG. 22 in which the exposure to ultra-sonic signals has promoted sudden formation of bubbles of dissolved gas throughout the liquid cider 248 some bubbles 252A may be relatively large whilst others 252B may be relatively small and may tend to collect linearly in wavy lines which may snake upwardly. Also the head 250 may rise to increase its height or depth. The gas bubbles form nucleation sites encouraging the quick formation of ice in the cider 248 from water of the water content of the cider. The ice rises. It may be of a slushy character and tends to agglomerate in the lower part of and below the head 250 to form a slushy mass of ice 262 such as indicated in FIG. 23 in the cider.

Going from the stage shown in FIG. 21 to that in FIG. 23 may only take one or two minutes so that the gas bubbling and the formation and visible development of the ice takes place fairly quickly and be interesting phenomena to observe through the glass 246.

Besides the ice forming in the cider 248 being an intriguing sight, it helps show the customer the cider is cold and that it has not been diluted by addition of ice from water other than that already in the cider.

One of the most interesting features is that the head 250 on the glass of cider may last for a considerable time, i.e. several times the duration of a head on cider arising from known methods. The head 250 may last for twenty minutes or so. Its longevity may be due to (i) the mass of ice 262 acting as a seal or barrier to gas attempting to leave the liquid cider body, and/or (ii) the fact that the ice 262 is keeping the head 250 cold.

An alternative method of applying the ultra-sound signals is represented in FIG. 24, in which after the apparatus 202 in FIG. 20 has dispensed a vessel or glass 246 of cider 248 an ultra-sound probe 264 powered through cable 266 is dipped into the cider for emitter 260A to give out ultra-sound signals. The probe 264 may be inserted into the cider before the full measured amount is supplied to the vessel 246.

In FIG. 25, the dispense outlet 220 has been arranged to act as an ultra-sonic probe for example by providing it with an ultra-sonic emitter 260B. The ultra-sonic probe 220 in FIG. 25 may emit ultra-sound signals whilst cider is passing through it to the vessel 246, and/or may become partially immersed in the cider as shown and emit ultra-sound signals into the cider 248 in the vessel 246 whilst the measured volume of cider is still being supplied or after it has been supplied.

Referring now to FIG. 26, a drinking vessel cooling apparatus 310 includes a cooling coil 312, a platform 314 and a motor 316. The platform 314 has a circular body 318 which is rotatable about an axis X—X which passes through its centre point and is perpendicular to its top surface 314a. A circumferentially extending retaining wall 320 is provided around the edge of the body 318 to retain a drinking vessel, in the form of a glass 322, thereon. The platform 314 is inclined at an angle to the horizontal such that the vessel 322 is also inclined when supported on it. The cooling coil 312 is helical having a lower end 312a level with the platform 314 and of a wider diameter. The coil 312 is also inclined at the same angle as the platform with respect to the horizontal, for example of a bar surface.

The motor 316 is connected to the platform 314 so as to effect rotation of the platform 314, in use.

The platform 314 is adapted to receive and retain the drinking vessel 322, by frictional engagement of the wall 320 with the sides of the vessel 322. When supported on the platform 314 the vessel 22 resides substantially completely within the cooling coil 312.

In order to serve a drink, a small amount a potable liquid 324, for example 5–10% of the volume of the vessel 322, is dispensed into the vessel 322. The motor 316 is actuated and the platform 314, and hence the vessel 322, is rotated such that the liquid 324 is displaced outward and up the inside wall of the vessel 322.

The cooling coil 312 acts to chill the vessel 322, and hence also the liquid 324, as the vessel is rotated, which causes the liquid 324 to freeze to the inside wall and base of the vessel 322. When the liquid 324 has frozen it has a non-level upper surface 326 which is concave and symmetrical about the centre of the vessel 322. This is partly due to the inclined angle of the vessel during freezing, and partly due to the centrifugal effect urging the liquid outwards and up the sides of the vessel 322 as it is rotated. This increases the surface area of the frozen liquid in contact with the beverage when the beverage is put into the vessel. Beverage is then introduced into the vessel on top of the frozen liquid 324.

It will be appreciated that the vessel need not be retained on the platform by frictional engagement with a wall but can be retained by any convenient means for example clips, bands, bars or a screw thread means.

While it may be preferable to dispense the beverage into the vessel as soon as the liquid has been frozen into it, another possibility is to store the vessel with the frozen liquid in it until it is needed to serve a beverage in. For example a freezer could be stocked with a number of cooled drinking vessels such that, when required, they could be rapidly removed and filled with beverage.

Referring now to FIG. 27, a drinking vessel cooling apparatus 326 according to a second embodiment of the invention includes a cooling coil 328, a platform 330, a motor 332, and first and second spray nozzles 334, 336.

The platform 330 and motor 332 are the same as those in the first embodiment except that the platform 330 is not inclined to the horizontal. A first nozzle is provided above the platform pointing downwards towards it, and is connected to a source of beverage so that it can introduce the beverage into a vessel 338 supported on the platform 330. A second nozzle 336 is provided near the platform 330, directed sideways towards the base 338a of the vessel 338, and is connected to a source of water so that it can spray water onto the outside of the vessel 338.

In use, the drinking vessel 338 is placed upon the platform 330 such that the lower part 338b of the vessel 338 lies substantially within the cooling coil 328, and the upper part 338c of the vessel 338 protrudes above the cooling coil 328. The motor 332 is actuated and the platform 330 rotates.

A potable liquid 340 in the form of a volume of beverage is sprayed from the nozzle 334 onto the inner surface 342 of the vessel, and a volume of potable liquid 341 is sprayed onto the outer surface 344 of the vessel 338.

The cooling coil 328 acts to chill the lower part of the vessel 338, and hence also the liquid that is in contact with that part of the vessel, and causes it to freeze upon the inner and outer surfaces 342, 344 of the vessel 338.

When the liquid has been frozen onto the vessel, a further volume of beverage is introduced, as a steady stream rather than a spray, into the vessel from the nozzle 334, and the beverage is ready to be served to a customer.

It will be appreciated that either of the nozzles 334, 336 can be omitted from the apparatus, and that the beverage forming the main volume of the drink served to the customer could be supplied from a separate nozzle, or even at a separate location such as at a conventional font. Although shown with the vessel 338 rotating any convenient arrangement in which there is relative rotational motion between the nozzles 334, 336 and the vessel 338 can be envisaged to spread the potable liquid over the surface of the vessel.

It will also be appreciated that the timing of the operation of the cooling coil 328 and the introduction of the beverage into the vessel can be varied. Either the glass 338 can be cooled first, and the beverage to be frozen onto it then added so that it freezes on contact with the glass. Alternatively the beverage can be introduced into the vessel 338 which is then cooled to cause freezing of the beverage. Obviously if the beverage is to be frozen to the sides of the vessel 338 rather than onto its base, then pre-cooling of the vessel will be required. As a further alternative the vessel can be completely filled with beverage and then the cooling coil 328 used to cool rapidly the lower part 338b of the vessel, without cooling the upper part 338c. This will cause some the beverage in the lower part 338b of the vessel to freeze to sides and base of the vessel, while the beverage in the upper part 338c of the vessel remains liquid.

The nozzle 336 may lie outside or inside the vertical extent of the cooling coil 328 and the coil 328 may have an opening to allow passage of the liquid 340 therethrough.

Referring to FIG. 28, in a third embodiment of the invention a drinking vessel in the form of a glass 350 is supported on a platform 352 which is arranged to be rotated by a motor 354. A cooling coil 356 is arranged around the position in which the glass 350 is supported so that it can cool the glass while it is on the platform 352. The platform 352 and cooling coil 356 are inclined to the horizontal so that the glass is supported at an inclined angle. A nozzle 358 is situated above the platform so that it can dispense liquid 360 against the top 362 of the inclined inner surface 364 of the side 366 of the glass 350. From there the liquid runs down the side of the glass as the glass is filled. While the liquid 360 is being dispensed into the glass, the side 366 of the glass is cooled by the cooling coil 356, and the glass is rotated about its central axis X—X which is inclined to the vertical. As the liquid runs down the side of the glass it freezes onto the glass, and, as the glass is rotated this forms a layer 368 of frozen liquid covering a substantial part of the inner surface of the glass.

When a sufficient layer of frozen liquid has built up, for example when a predetermined volume of liquid 360 has been dispensed, liquid beverage is dispensed into the glass through the nozzle 358. In this particular embodiment the liquid which is frozen onto the glass is a volume of the beverage. This ensures that, as the frozen liquid melts, the beverage will not be diluted. However it will be appreciated that a small volume of another potable liquid, such as water, could be frozen onto the glass.

It will be appreciated that in the embodiments of FIGS. 26, 27 and 28 the platforms need not be circular but can be any convenient shape to receive a vessel of complementary shape to the platform.

It will be appreciated that it is possible to supercool the beverage prior to dispense, whether that be dispense from a dispense tap or from a closed container (such as a bottle), and to dispense the beverage in a substantially liquid state, with substantially no ice yet formed in it, into the vessel (e.g. a drinking vessel such as a glass, or plastic glass typically a transparent drinking vessel) and to have ice form in the beverage whilst it is in the drinking vessel, typically in front of a customer at a bar. In this way, the customer can see that a full measure of beverage (e.g. beer) was dispensed into the vessel/glass, and has not been "short measured" by the barman, and he can then see an interesting visual effect as ice forms in the beverage due to the beverage having been supercooled.

An alternative, which would still give the interesting visual effect, is to dispense the beverage not supercooled—i.e. ice does not spontaneously form in the beverage as it is dispensed, but instead to impart an additional thermal change on the beverage post-dispense. This additional thermal change could be the lowering of the temperature of the beverage by dispensing it into a vessel/glass that is itself at a low enough temperature that it causes the temperature of the beverage held within it to fall sufficiently to cause ice to form in the beverage. Preferably the vessel is significantly colder than the dispensed beverage, the glass may be some 1C.°, 2C.°, 5° C. or 10° C. colder than the beverage. To enable this to happen, bearing in mind the thermal mass of a glass and the thermal mass of a measure of beverage (e.g. a half-pint or a pint), it would probably be necessary to have the beverage dispensed into the vessel with the beverage at a temperature that is only just above the ice-formation point of the beverage when it is in the vessel. The thermal mass of a volume of beverage in comparison with the thermal mass of a glass/drinking vessel is quite high—and so the difference in thermal mass, and difference in temperature, needs to be taken into account when determining by how much the temperature of the beverage will fall post-dispense into a cold glass—colder than the temperature of the beverage. In order to avoid extreme temperature differences between the glass and the beverage (as dispensed beverage), being needed to cause ice formation, it is best to have the temperature of the beverage at the point of dispense be only just above the ice formation point.

By "only just above" we typically mean within 1° C., or 2° C. Preferably, we mean within 1°, or ½° C. Indeed, we may dispense the beverage practically at freezing point—but without sufficient difference in energy levels/sufficient imbalance in the physical state of the beverage, ice is unlikely to form very quickly just at the dispense temperature.

This brings us onto another interesting point. We prefer to form the ice quickly. This enables us to have a large number of small crystals, rather than a fewer number of larger crystals. Once there are a few ice crystals in the beverage, ice will tend to form on those crystals, as nucleation sites, rather than break out new nucleation sites. That is the case if ice is formed slowly. We prefer to have a large number (e.g. hundreds, of the order of hundreds, or even thousands) of crystals. To do this, we prefer to cause the ice to form over a timescale of about 0-30 seconds, preferably 0–20 seconds. However, we could of course have ice form over a longer timescale, possibly of the order of 1 minute, or 1½ minutes, or 2 minutes.

Another advantageous feature of having the ice form quickly is that a customer can see it happen reasonably straight away after they have received the glass of beverage. It is probably undesirable to have a customer have to wait too long to see ice form.

Another way of forming ice in a beverage held in a drinking vessel in front of the consumer whilst they watch, is to have a body or object present in the drinking vessel/ glass that is so cold that it lowers the temperature of the beverage after it has originally been dispensed into the glass. Preferably the body or object is significantly colder than the as-dispensed beverage, for example, some 1° C., 2° C., 5° C., 10° C. or 20° C. colder than the as-dispensed beverage. Hypothetically, this body could be, for example, a base plate the bottom of a drinking vessel that has a relatively high heat capacity, and good thermal conductivity—for example a metal plate. This may make drinking vessels expensive to manufacture.

A metal drinking vessel may be used, appropriately cooled to below the temperature of the beverage as-dispensed—preferably significantly below—significantly enough below to cause ice to form in the beverage in the vessel.

Another way of providing such a "body" is to freeze a portion of beverage, in advance, into the glass/drinking vessel. This could, for example, be frozen as a layer of ice extending completely or partially over the surface—for example over the base of the glass, or over a part of the side wall/all the side walls, or over both the base and the side walls. An advantage of such an ice-body pre-frozen in the glass/vessel is that as beverage is poured into the vessel, the body of ice will not only cool the temperature of the beverage, encouraging the formation of new ice from the beverage, but it will also break away from the vessel itself and float in the beverage—giving a similar appearance to ice that has been formed from the water content of the beverage.

It will be appreciated that if (and this is not necessarily a requirement) the ice that is in the drinking vessel is frozen from the same beverage as is dispensed into it (same kind of beverage), then the overall alcohol content of the combined "ice body plus beverage" that is in the drinking vessel will be the same as if the drinking vessel had just been filled with "normal" alcoholic beverage. This can be beneficial in jurisdictions where tax is paid on the amount of alcohol in a measure of beverage.

Another way of causing ice to form in a beverage after it is in a drinking vessel is to cool the body of beverage by providing a heat extraction pathway once the beverage is in the vessel. This heat extraction pathway could be as depicted in FIG. 31 introducing a cooling element 389 into the beverage 390 once dispensed into a drinking vessel 392—for example dipping in a "cooling wand", and cooling the beverage using the depending cooling instrument—for example the "dipping wand" could be a thermoelectric cooler.

Another way of providing a heat extraction pathway is to cool the drinking vessel, thereby indirectly cooling the beverage. This may be facilitated by having a high thermal transfer region of the drinking vessel (e.g. a metal portion). However, this is not necessary. A simple way might be to put a drinking vessel into contact with a source of cold post-beverage-dispensed into the drinking vessel, and to leave the vessel in contact with the source of coldness until an appropriate amount of ice has formed. One possible way is depicted in FIG. 29 where the drinking vessel 380 containing dispensed beverage 382 is placed on a cold-plate 384 (e.g. a Peltier effect plate, or a thermoelectric device), or in a bath 385 of cold liquid/slurry 387 as depicted in FIG. 30.

By providing ice in a beverage, we provide a thermal reservoir in the beverage, in the drinking vessel, which helps to maintain the temperature of the beverage at the melting point of the ice. Instead of the temperature of the beverage rising with time, ice melts, sacrificing the ice for the sake of maintaining the cold temperature of the beverage. Thus, our beverage stays colder for longer, due to the reservoir of ice present in the beverage. This has great attractions to consumers who want cold alcoholic beverages, such as beer.

By having the ice form in the beverage whilst the consumer watches, typically at a bar in front of the consumer, we provide added theatre to the act of dispense/experience of receiving a glass/drinking vessel of beer/beverage. It is also a way of preventing a customer from feeling that the beverage/beer has been watered down—if they were simply given a glass of beer with some ice floating in it, and did not know that the ice had come from the water content of the beer, they may feel that the beer had been watered down and that they were paying for ice. This would be an undesirable psychological reaction in many circumstances.

An insulating layer of foam/head above the layer of ice can have a synergistic effect. The foam firmly insulates the ice, and keeps the ice cooler than if there were no layer of foam above it. The layer of ice can form a stable basis to support a firm head, enabling the head to last longer than if it were unsupported. This is not a requirement of all embodiments of the invention, but it is an interesting possibility for some.

We claim:

1. A method of keeping a draught-dispensed, alcoholic beverage in an open-topped drinking vessel cool, said beverage comprising a water content, an alcohol content, and a dissolved gas content, and said method comprising the steps of dispensing said beverage from a dispense tap into said drinking vessel and forming a plurality of ice crystals in said vessel from a portion of said water content of said dispensed beverage, whereby said ice crystals have a cooling effect on the beverage, wherein said portion of said water content is in a range of 0.5% to 3% by weight.

2. The method according to claim 1 further comprising the step of delivering said beverage to said dispense tap in a supercooled condition.

3. The method according to claim 1 wherein said dispensing step is performed, such that a measure of beverage as liquid beverage enter said drinking vessel and formation of said plurality of ice crystals in said beverage in said drinking vessel are visible to a customer.

4. The method according to claim 1 further comprising the step of providing said plurality of ice crystals as a thermal reservoir in the beverage and allowing said plurality of ice crystals to gradually melt in said dispensed beverage to keep said beverage at a lower temperature for a longer period of time.

5. The method according to claim 1 further comprising the step of forming a head on the beverage.

6. The method according to claim 1 wherein the plurality of ice particles floats at or near a liquid surface of the beverage and further comprising the step of forming a head above said plurality of ice crystals thereby insulating said plurality of ice crystals from heat generated towards said plurality of ice crystals from above said head.

7. The method according to claim 5 wherein said beverage is selected from the group consisting of beer, lager and cider.

8. The method according to claim 7 wherein said alcohol content is in the range 2.5% abv to 7% abv.

9. The method according to claim 8 wherein said alcohol content is in the range 4–5% abv .+–. 1% abv.

10. A method of sustaining a head on cider in an open-topped drinking vessel wherein said cider comprises a dissolved gas content, an alcohol content, and a water content, said method comprising the steps of dispensing said cider into said drinking vessel; forming a plurality of ice crystals in said vessel from a portion of said water content of said cider; and forming a head of foam in the cider, such that said plurality of ice crystals forming a layer covered by said head, wherein said portion of said water content is in a range of 0.5% to 3% by weight.

11. A method of sustaining a cooling, plurality of ice crystals in a beverage in an open-topped drinking vessel, said beverage comprising water content and a dissolved gas content, said method comprising the steps of providing a head of foam on a liquid surface of said beverage; forming a plurality of ice crystals in said vessel from a portion of said water content of said beverage, which plurality of ice crystals floats at or near a liquid surface of the beverage; and insulating said plurality of ice crystals by covering said plurality of said ice crystals with said head, whereby in said vessel the plurality of ice crystals is shielded against heat directed towards said ice crystals from above said head, wherein said portion of said water content is in a range of 0.5% to 3% by weight.

12. The method according to claim 11, wherein said beverage is a draught alcoholic beverage.

13. The method according to claim 1, wherein each ice crystal of said plurality of ice crystals has a diameter of less than 10 mm.

14. The method according to claim 13 wherein seventy-five percent of said plurality of ice crystals have a diameter less than or equal to about 4 mm.

15. The method according to claim 1, wherein said plurality of ice crystals forms a layer extending substantially across an open-top of said drinking vessel.

16. The method according to claim 10, wherein said plurality of ice crystals forms a layer extending substantially across an open-top of said drinking vessel.

17. The method according to claim 11, wherein said plurality of ice crystals forms a layer extending substantially across an open-top of said drinking vessel.

18. The method according to claim 1, wherein said portion of said water content is in a range of 1% to 2% by weight.

19. The method according to claim 10, wherein said portion of said water content is in a range of 1% to 2% by weight.

20. The method according to claim 11, wherein said portion of said water content is in a range of 1% to 2% by weight.

21. The method of claim 1, wherein said beverage is a beer and is dispensed at a temperature in a range of −12° C. to −1° C.

22. The method of claim 21, wherein said beverage is dispensed at a temperature in a range of −6° C. to −4° C.

23. The method of claim 21, wherein said beverage has an alcohol content of 4.5% abv and is dispensed at a temperature of about −5° C.

24. The method of claim 1, further comprising the step of controlling a temperature of said beverage prior to dispensing.

25. The method of claim 1, further comprising the step of recirculating said beverage within means for dispensing prior to dispensing said beverage.

26. The method of claim 10, further comprising the step of controlling a temperature of said cider prior to dispensing.

27. The method of claim 10, further comprising the step of recirculating said cider within means for dispensing prior to dispensing said cider.

28. The method of claim 1, further comprising the step of creating nucleation sites for the formation of ice crystals within said beverage.

29. The method of claim 28, wherein said step of creating nucleation sites further comprises the step of applying ultrasound signals to said beverage.

30. The method of claim 10, further comprising the step of creating nucleation sites for the formation of ice crystals within said cider.

31. The method of claim 30, wherein said step of creating nucleation sites further comprises the step of applying ultrasound signals to said cider.

32. The method of claim 11, further comprising the step of forming a plurality of ice crystals further comprises the step of creating nucleation sites for the formation of ice crystals within said beverage.

33. The method of claim 32, wherein said step of creating nucleation sites further comprises the step of applying ultrasound signals to said beverage.

* * * * *